(12) United States Patent
Yoshida

(10) Patent No.: US 7,245,397 B2  
(45) Date of Patent: Jul. 17, 2007

(54) APPARATUS AND METHOD FOR HALFTONING COLOR IMAGE BY QUANTIZING TONE LEVEL OF SUBJECT PIXEL BASED ON TONE LEVELS OF NEIGHBORING PIXELS

(75) Inventor: Yasunari Yoshida, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 221 days.

(21) Appl. No.: 11/109,752

(22) Filed: Apr. 20, 2005

(65) Prior Publication Data
US 2005/0237359 A1    Oct. 27, 2005

(30) Foreign Application Priority Data
Apr. 21, 2004    (JP)    ............... 2004-125004

(51) Int. Cl.
G06F 15/00    (2006.01)
B41J 2/205    (2006.01)
(52) U.S. Cl. ............... 358/1.9; 358/1.2; 358/502; 347/15
(58) Field of Classification Search .......... 347/15, 347/43; 358/1.2, 1.9, 3.01, 3.06, 502, 534
See application file for complete search history.

(56) References Cited

U.S. PATENT DOCUMENTS

| | | | | |
|---|---|---|---|---|
| 5,184,213 A | * | 2/1993 | Ishida | 358/500 |
| 5,614,931 A | * | 3/1997 | Koike et al. | 347/43 |
| 5,717,448 A | * | 2/1998 | Inada | 347/43 |
| 5,767,876 A | * | 6/1998 | Koike et al. | 347/43 |
| 5,933,577 A | * | 8/1999 | Naitoh et al. | 358/1.9 |
| 6,851,783 B1 | * | 2/2005 | Gupta et al. | 347/15 |
| 6,870,642 B2 | * | 3/2005 | Ostromoukhov | 358/3.03 |
| 6,870,644 B2 | * | 3/2005 | Schramm et al. | 358/3.05 |
| 6,943,918 B1 | * | 9/2005 | Kakutani | 358/3.02 |
| 7,050,194 B1 | * | 5/2006 | Someno et al. | 358/1.9 |
| 7,061,645 B2 | * | 6/2006 | Chang | 358/1.9 |
| 7,086,712 B2 | * | 8/2006 | Abello | 347/15 |
| 2003/0090728 A1 | * | 5/2003 | Schramm et al. | 358/3.04 |

(Continued)

FOREIGN PATENT DOCUMENTS

| JP | A 05-162339 | 6/1993 |
|---|---|---|
| JP | A 07-40548 | 2/1995 |
| JP | A 11-254663 | 9/1999 |
| JP | A 11-320922 | 11/1999 |
| JP | B2 3291928 | 3/2002 |

Primary Examiner—Matthew Luu  
Assistant Examiner—Justin Seo  
(74) Attorney, Agent, or Firm—Oliff & Berridge, PLC

(57) ABSTRACT

An image forming apparatus is disclosed in which a quantization is effected for a halftone color image decomposed into pixels, in which a comparison is made, for respective separate color-components of each pixel, between a tone level of each pixel and a threshold value, and in which the tone level of each pixel is quantized to produce a discrete value having n levels. With a neighboring pixel of the subject pixel containing a first color-component, and with the subject pixel containing a second color-component, a relationship between the tone level of the second color-component of the subject pixel and the threshold value is compensated, such that, as the tone level of the first color-component of the neighboring pixel increases, a probability of occurrence of a second color-component ink dot formed at the subject pixel and/or a volume of an ink used for the same dot at the subject pixel, decreases.

24 Claims, 29 Drawing Sheets

U.S. PATENT DOCUMENTS

| | | |
|---|---|---|
| 2003/0103241 A1* | 6/2003 | Sharma ..................... 358/3.06 |
| 2004/0090654 A1* | 5/2004 | Minnebo et al. ........... 358/3.03 |
| 2005/0094211 A1* | 5/2005 | Dang ........................ 358/3.03 |
| 2005/0219567 A1* | 10/2005 | Gupta et al. ................. 358/1.9 |

* cited by examiner

TONE LEVELS IN YELLOW
COLOR PLANE CALCULATED
BY ERROR DIFFUSION METHOD

| A | B | C |
|---|---|---|
| 255 | 64 | 0 |

| RESOLUTION (DPI) | PIXEL SIZE (μm) | PRINT MEDIUM | DROPLET SIZE (pl) | K COLOR INK | Y COLOR INK | *1 | *2 | *3 |
|---|---|---|---|---|---|---|---|---|
| 1200 | 21.2 | STANDARD PAPER | 3 | 51 | 59 | 55 | 2.598425197 | 2 |
| | 21.2 | | 8 | 64 | 73 | 68.5 | 3.236220472 | 3 |
| | 21.2 | | 16 | 80 | 92 | 86 | 4.062992126 | 4 |
| 600 | 42.3 | STANDARD PAPER | 3 | 51 | 59 | 55 | 1.299212598 | 1 |
| | 42.3 | | 8 | 64 | 73 | 68.5 | 1.618110236 | 1 |
| | 42.3 | | 16 | 80 | 92 | 86 | 2.031496063 | 2 |
| 1200 | 21.2 | INKJET PAPER | 3 | 42 | 48 | 45 | 2.125984252 | 2 |
| | 21.2 | | 8 | 48 | 55 | 51.5 | 2.433070866 | 2 |
| | 21.2 | | 16 | 64 | 73 | 68.5 | 3.236220472 | 3 |
| 600 | 42.3 | INKJET PAPER | 3 | 42 | 48 | 45 | 1.062992126 | 1 |
| | 42.3 | | 8 | 48 | 55 | 51.5 | 1.216535433 | 1 |
| | 42.3 | | 16 | 64 | 73 | 68.5 | 1.618110236 | 1 |
| 1200 | 21.2 | GLOSSY PAPER | 3 | 35 | 39 | 37 | 1.748031496 | 1 |
| | 21.2 | | 8 | 40 | 44 | 42 | 1.984251969 | 1 |
| | 21.2 | | 16 | 55 | 61 | 58 | 2.740157480 | 2 |

*1 = MINIMUM REGION PREVENTING OVERLAP OF K AND Y COLOR INK DOTS
(= RADIUS OF K COLOR INK DOT + RADIUS OF Y COLOR INK DOT)

*2 = (MINIMUM REGION PREVENTING OVERLAP OF K AND Y COLOR INK DOTS) / (PIXEL SIZE)

*3 = MINIMUM NUMBER OF CONSECUTIVE PIXELS PREVENTING OVERLAP OF K AND Y COLOR INK DOTS

APPARATUS AND METHOD FOR HALFTONING COLOR IMAGE BY QUANTIZING TONE LEVEL OF SUBJECT PIXEL BASED ON TONE LEVELS OF NEIGHBORING PIXELS

This application is based on Japanese Patent Application No. 2004-125004 filed Apr. 21, 2004, the content of which is incorporated hereinto by reference.

CROSS-REFERENCE TO RELATED APPLICATIONS

Not Applicable.

BACKGROUND OF THE INVENTION

1. Field of the Invention

The invention relates to techniques of effecting an n-level quantization for a halftone multi-colored image decomposed into a plurality of pixels, for respective separate color-components contained in each pixel, and of forming ink dots using a plurality of different colored inks corresponding to the respective separate color-components, depending on the results of the n-level quantization.

The invention relates more particularly to techniques of effecting the n-level quantization for a subject pixel to reflect the tone levels of neighboring pixels of the subject pixel, to thereby suppress color bleed or spread between these pixels.

2. Description of the Related Art

There are known recording or printing devices of a color inkjet type. An example of such recording or printing devices is configured to perform a recording operation in which inks are jetted onto a recording sheet of paper, to thereby form the corresponding ink dots on the recording sheet. The inks each contain fine particles of separate colors: Cyan (C), Magenta (M), Yellow (Y), and Black (K).

It takes a few minutes before such an ink is dried and such fine particles of the ink are fixed to the recording sheet to form an ink dot, during which a solvent of the ink evaporates and penetrates into between fibers of the recording sheet.

The time required for the ink dot fixing (e.g., a drying time) is varied in length depending on the type of the ink used. For example, a pigment-based ink, which is harder to penetrate into between fibers of the recording sheet than a dye-based ink, requires a longer time to form an ink dot than the dye-based ink.

FIGS. 22A and 22B each schematically illustrate in enlargement a particle 100 of Y color ink and a particle 101 of K color ink with these being jetted onto a recording sheet at the respective positions adjacent to each other. FIG. 22A illustrates these particles 100, 101 in a state with the corresponding inks having been just jetted onto the recording sheet, while FIG. 22B illustrates these particles 101, 101 in a state with a given length of time having been elapsed since the corresponding inks were jetted onto the recording sheet.

In an example where the K color ink is a pigment-based ink, while the Y color ink is a dye-based ink, as shown in FIG. 22B, the particle 100 of the Y color ink penetrates into between fibers of the recording sheet faster or earlier than the particle 101 of the B color ink.

Due to the difference in penetration rate between the particles 100, 101, a portion of the particle 101 of the K color ink is brought into contact with the particle 100 of the Y color ink, and the particle 101 of the K color ink, because of a surface tension acting on the aforementioned portion thereof, is drawn toward the particle 100 of the Y color ink, resulting in color bleed causing a K color ink dot region to spread over a Y color ink dot region.

In particular, in the case where a character is printed in black on a recording sheet with its under color being selected yellow, a limitation arises that the outline of the printed character becomes indistinct due to the spread of the K color ink used for forming the black colored character over the yellow colored underground of the recording sheet. An added limitation also arises that the spread of the black color over the yellow under color is particularly noticeable, due to the contrast of the black color with the yellow color.

To overcome the above limitations, a technique is disclosed in Japanese Publication HEI 5-162339 for controlling the volume of an ink to be jetted onto a recording sheet, so that adjacent ink dots different in color are printed on the recording sheet using the corresponding inks at least one of which is reduced in volume than a standard value.

BRIEF SUMMARY OF THE INVENTION

The case exists where a recording device of an inkjet type as described above is configured to deposit a Y color ink dot as a fixing additive onto a K color solid region of a recording sheet, for enhancing an ability of its K color ink to be fixed to the K color solid region.

However, the conventional technique described above, upon application to such a recording device, would cause a limitation that the dot size (e.g., dot diameter) of the Y color ink dot deposited on the recording sheet as the fixing additive is likely to be reduced, resulting in an inadequate improvement in ability of the K color ink to be fixed, with an unsatisfactory enhancement in an image quality.

In addition, the conventional technique described above, when practiced, would cause a reduction in the dot size of at least one of the adjacent ink dots, only if there is a different in color between these adjacent ink dots, irrespective of whether or not there is less likely to occur a problem of color bleed or spread between these adjacent ink dots different in color.

For the above reasons, the above conventional technique, although is advantageous in suppressing color bleed or spread noticed with a printed recording sheet being viewed locally, i.e., on a per dot basis, presents a problem that there creates an unexpected white line noticed with the printed recording sheet being viewed globally, at a boundary region, which is to say, for example, a region between the black colored character and the underground designated to be colored yellow, both of which are formed on the recording sheet. This results in deterioration of an image quality.

It is therefore an object of the present invention to provide an image forming technique of effecting an n-level quantization for a subject pixel to reflect the tone levels of neighboring pixels of the subject pixel, with color bleed or spread between the subject pixel and the neighboring pixels being suppressed, while facilitating improvement in image quality.

According to a first aspect of the present invention, an apparatus for forming an image is provided, which comprises:

an n-level quantizer effecting an n-level quantization for a halftone color image decomposed into a plurality of pixels, on a per pixel basis, the n-level quantizer comparing, for respective separate color-components contained in each pixel, a tone level of the each pixel and at least one threshold value, and quantizing the tone level of the each pixel to produce a discrete value having a plurality of levels (n), with each other, the produced discrete value being indicative of a corresponding one of a plurality of separate states (n) to the each pixel; and a printer forming ink dots using a plurality of different colored inks corresponding to the respective separate color-components, according to the corresponding discrete values produced by the n-level quantization on a per pixel basis, wherein each pixel becomes a subject pixel for which the n-level quantization is to be effected, wherein at least one of the plurality of pixels located in the vicinity of the subject pixel becomes at least one neighboring pixel, and wherein the n-level quantizer, for effecting the n-level quantization for each subject pixel, with the at least one neighboring pixel containing a first one of the separate color-components, and with the subject pixel containing a second one of the separate color-components different in color from the first color-component, compensates a relationship between the tone level of the second color-component of the subject pixel and the at least one threshold value, such that, as the tone level of the first color-component contained in the at least one neighboring pixel increases, at least one of a probability of occurrence of an ink dot formed at the subject pixel using a corresponding one of the plurality of different colored inks to the second color-component contained in the subject pixel, and a volume of the corresponding ink to the second color-component contained in the subject pixel used for forming an ink dot at the subject pixel, decreases.

The above apparatus allows the n-level quantization of the tone level of the second color-component of the subject pixel in the halftone color image, in a manner that reflects the tone level of the first color-component different in color from the second color-component, of the neighboring pixel in the same halftone color image.

Therefore, the above apparatus allows reduction in area in which the inks are in contact with each other which correspond to the first and second color-components, respectively, provided that the tone level of the first color-component of the neighboring pixel is absolutely or relatively high.

This results in suppression in color bleed or spread of the ink dot formed using the ink corresponding to the first color-component over the ink dot formed using the ink corresponding to the second color-component.

According to a second aspect of the present invention, a method of forming an image is provided, which comprises the steps of;

effecting an n-level quantization for a halftone color image decomposed into a plurality of pixels, on a per pixel basis, the step of effecting the n-level quantization including the step of comparing, for respective separate color-components contained in each pixel, a tone level of the each pixel and at least one threshold value, and quantizing the tone level of the each pixel to produce a discrete value having a plurality of levels (n), with each other, the produced discrete value being indicative of a corresponding one of a plurality of separate states (n) to the each pixel; and forming ink dots using a plurality of different colored inks corresponding to the respective separate color-components, according to the corresponding discrete values produced by the n-level quantization on a per pixel basis, wherein each pixel becomes a subject pixel for which the n-level quantization is to be effected, wherein at least one of the plurality of pixels located in the vicinity of the subject pixel becomes at least one neighboring pixel, and wherein the step of effecting the n-level quantization, for effecting the n-level quantization for each subject pixel, with the at least one neighboring pixel containing a first one of the separate color-components, and with the subject pixel containing a second one of the separate color-components different in color from the first color-component, includes the step of compensating a relationship between the tone level of the second color-component of the subject pixel and the at least one threshold value, such that, as the tone level of the first color-component contained in the at least one neighboring pixel increases, at least one of a probability of occurrence of an ink dot formed at the subject pixel using a corresponding one of the plurality of separate inks to the second color-component contained in the subject pixel, and a volume of the corresponding ink to the second color-component contained in the subject pixel used for forming an ink dot at the subject pixel, decreases.

The above method provides basically the same and effects as the above apparatus, according to basically the same principle as the apparatus.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities show. In the drawings:

FIG. 6B illustrates an example of a set of ultimate tone levels or density values in the Y color plane calculated from the example indicated in FIG. 6A by the error diffusion method in the first embodiment;

FIG. 8A illustrates an example of a set of input tone levels Iy in a Y color plane, FIG. 8A being similar to FIG. 6A;

FIG. 8B illustrates an example of a set of ultimate tone levels or density values in the Y color plane calculated from the example indicated in FIG. 8A by the error diffusion method in the first embodiment, with the input tone levels Iy being compensated using the compensation factor α determined based on the table illustrated in FIG. 7, FIG. 8B being similar to FIG. 6B;

FIG. 13 illustrates an example of a set of ultimate tone levels or density values in the Y color plane calculated by the error diffusion method in the second embodiment, with the input tone levels Iy being compensated using an error compensation value γ calculated using the compensation factor δ determined based on the table illustrated in FIG. 12, FIG. 13 being similar to FIG. 8B;

FIG. 16A illustrates an example of a set of threshold values Tmat allocated according to a dither matrix in the third embodiment;

FIG. 16B illustrates an example of a set of threshold values T obtained by compensating the threshold values Tmat illustrated in FIG. 16A using the threshold compensation values β;

FIG. 18 illustrates an example of a set of threshold values T obtained by compensating the threshold values Tmat illustrated in FIG. 16A using the threshold compensation values β determined based on the table illustrated in FIG. 17, FIG. 18 being similar to FIG. 16B;

FIG. 19B is a table for explaining the dependency between the selection of neighboring pixels and whether or not an overlap between ink dots is present;

FIG. 20A illustrates an example of a set of input tone levels Iy in a Y color plane, with the neighboring pixels being defined to cover up to pixels spaced two pixels apart from the subject pixel;

DETAILED DESCRIPTION OF THE INVENTION

Figure 1:
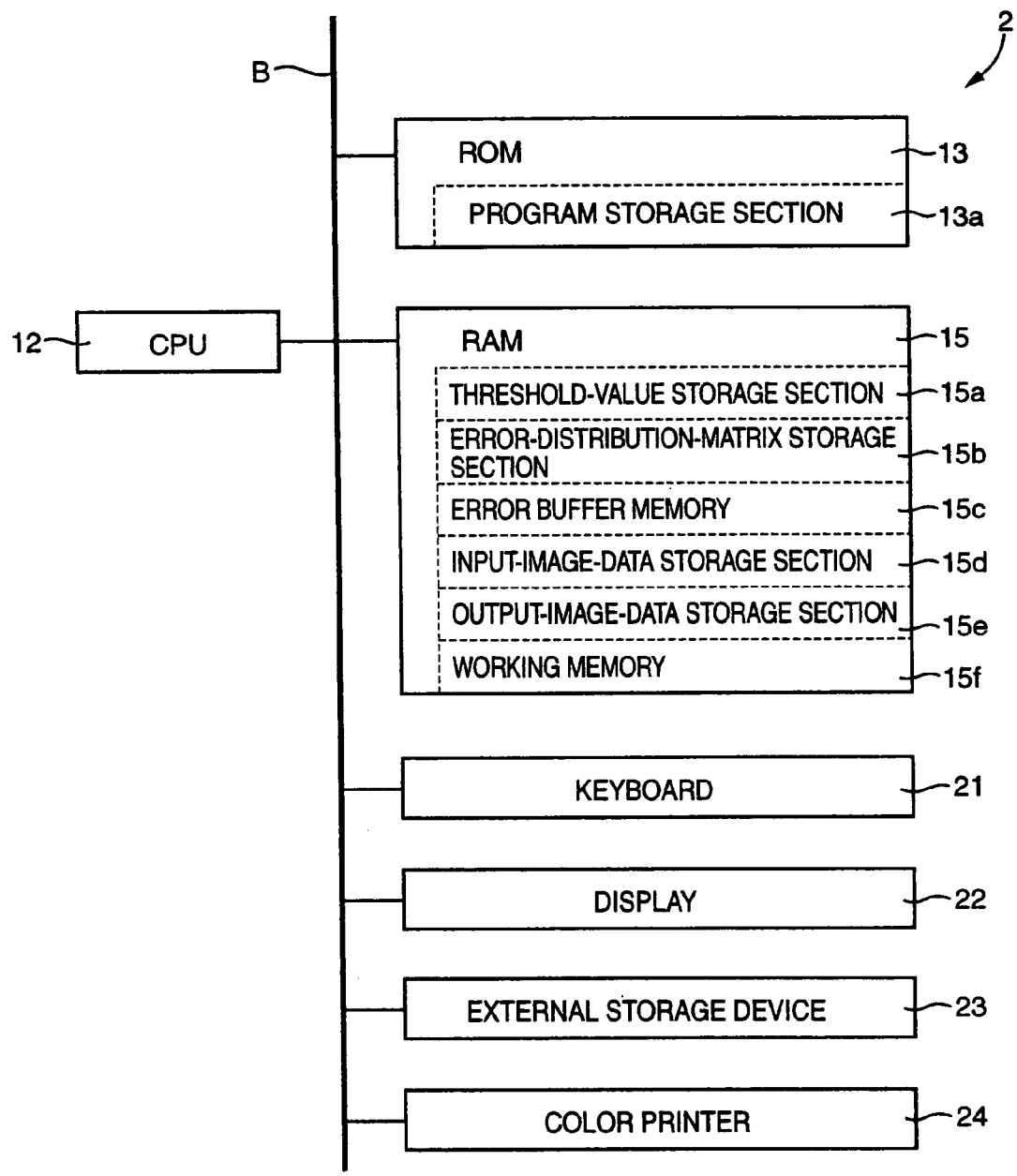
FIG. 1 is a block diagram schematically illustrating in construction an image forming apparatus according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An apparatus for forming an image, comprising:

an n-level quantizer effecting an n-level quantization for a halftone color image decomposed into a plurality of pixels, on a per pixel basis, the n-level quantizer comparing, for respective separate color-components contained in each pixel, a tone level of the each pixel and at least one threshold value, and quantizing the tone level of the each pixel to produce a discrete value having a plurality of levels (n), with each other, the produced discrete value being indicative of a corresponding one of a plurality of separate states (n) to the each pixel; and a printer forming ink dots using a plurality of different colored inks corresponding to the respective separate color-components, according to the corresponding discrete values produced by the n-level quantization on a per pixel basis, wherein each pixel becomes a subject pixel for which the n-level quantization is to be effected, wherein at least one of the plurality of pixels located in the vicinity of the subject pixel becomes at least one neighboring pixel, and wherein the n-level quantizer, for effecting the n-level quantization for each subject pixel, with the at least one neighboring pixel containing a first one of the separate color-components, and with the subject pixel containing a second one of the separate color-components different in color from the first color-component, compensates a relationship between the tone level of the second color-component of the subject pixel and the at least one threshold value, such that, as the tone level of the first color-component contained in the at least one neighboring pixel increases, at least one of a probability of occurrence of an ink dot formed at the subject pixel using a corresponding one of the plurality of different colored inks to the second color-component contained in the subject pixel, and a volume of the corresponding ink to the second color-component contained in the subject pixel used for forming an ink dot at the subject pixel, decreases.

The apparatus according to the above mode (1) allows the n-level quantization of the tone level of the second color-component of the subject pixel in the halftone color image, in a manner that reflects the tone level of the first color-component different in color from the second color-component, of the neighboring pixel in the same halftone color image.

Therefore, the apparatus according to the above mode (1) allows reduction in the area in which the different colored inks corresponding to the first and second color-components are in contact with each other, provided that the tone level of the first color-component of the neighboring pixel is absolutely or relatively high.

This results in suppression in color bleed or spread of the ink dot formed using the ink corresponding to the first color-component over the ink dot formed using the ink corresponding to the second color-component.

(2) The apparatus according to mode (1), wherein the n-level quantizer compensates at least one of the tone level of the second color-component contained in the subject pixel and the at least one threshold value, to thereby compensate the relationship.

The apparatus according to the above mode (2) permits, prior to the n-level quantization of the tone level of the subject pixel, the compensation of at least one of the tone level of the second color-component of the subject pixel and the at least one threshold value, depending on the tone level of the first color-component of the neighboring pixel.

Therefore, the apparatus according to the above mode (2) allows the control of at least one of the probability of occurrence of the second color-component ink dot formed at the subject pixel and the volume of the ink used for forming the second color-component ink dot, so as to reflect precisely the tone level of the neighboring pixel, as compared with the case where the compensation depending on the tone level of the neighboring pixel is made after and for the result of the n-level quantization of the tone level of the subject pixel.

As a result, the apparatus according to the above mode (2) achieves the formation of an image in an improved quality, while suppressing unintended color bleed or spread.

(3) The apparatus according to mode (1) or (2), wherein the n-level quantizer effects the n-level quantization for the halftone color image, such that the tone level of the subject pixel reflects a quantization error occurring due to the n-level quantization effected for the at least one neighboring pixel, and wherein the n-level quantizer compensates at least one of the tone level of the second color-component contained in the subject pixel and the quantization error occurring due to the n-level quantization effected for the at least one neighboring pixel, to thereby compensate the relationship, the quantization error being to be reflected by the tone level of the subject pixel.

The apparatus according to the above mode (3) allows the implementation of the n-level quantization of the neighboring pixel so as to reflect the quantization error due to the n-level quantization effected for the subject pixel.

Therefore, the apparatus according to the above mode (3) allows adjustment of the overall and average value of the tone level or density level in a boundary region separating the first color-component region and the second color-component region from each other, according to the tone level of the first color-component, the overall and average value being measured by viewing the whole halftone color image.

As a result, the apparatus according to the above mode (3) achieves the formation of an image in an improved quality, while suppressing unintended color bleed or spread.

(4) The apparatus according to mode (3), wherein the n-level quantizer effects the n-level quantization for the halftone color image by an error diffusion method, such that the tone level of the subject pixel reflects the quantization error occurring due to the n-level quantization effected for the at least one neighboring pixel.

(5) The apparatus according to any one of modes (1)-(4), wherein the at least one threshold value is established for the plurality of pixels of the halftone color image in common.

(6) The apparatus according to any one of modes (1)-(4), wherein the at least one threshold value comprises a plurality of threshold-value sets each having at least one of individual threshold value (n−1), with each set being established for each pixel of the halftone color image, wherein the n-level quantizer effects the n-level quantization on a per pixel basis, for each separate color-component, by comparing a corresponding one of the plurality of threshold-value sets to the subject pixel, and the tone level of the subject pixel, with each other, and wherein the n-level quantizer compensates at least one of the tone level of the second color-component contained in the subject pixel and the corresponding threshold-value set, to thereby compensate the relationship.

The apparatus according to the above mode (6) performs the n-level quantization of the tone level of each color component of each pixel by comparing the tone level and the threshold value with each other, the threshold value being predetermined on a per pixel basis. Therefore, the apparatus achieves suppression of unintended color bleed or spread together with improvement in an image quality, in the environment where the n-level quantization is effected using the threshold value predetermined on a per pixel basis, an example of which is a dither method.

(7) The apparatus according to mode (6), wherein the n-level quantizer effects the n-level quantization by a dither method.

(8) The apparatus according to any one of modes (1)-(7), wherein a color of a first one of the plurality of different colored inks corresponding to the first color-component is lower in lightness than that of a second one of the plurality of different colored inks corresponding to the second color-component.

The apparatus according to the above mode (8), when the tone level of the first color-component of the neighboring pixel is high, reduces at least one of the probability of occurrence of an ink dot formed using the ink of the second component-color, and the volume of the same ink forming an ink dot, with the second color-component is higher in lightness than the first color-component.

Therefore, the apparatus according to the above mode (8), owing to the order in lightness between these two color-components, is advantageous in keeping the perception obtained from the whole printed image unchanged, as compared with the case where the reduction is made in at least one of the probability of occurrence of the first color-component ink dot and the volume of the ink used for the first color-component ink dot.

(9) The apparatus according to any one of modes (1)-(8), wherein a color of a first one of the plurality of different colored inks corresponding to the first color-component is black.

The apparatus according to the above mode (9) prevents color bleed or spread from being caused in a black color ink dot particularly noticeable.

(10) The apparatus according to any one of modes (1)-(9), wherein a color of a second one of the plurality of different colored inks corresponding to the second color-component is yellow.

The apparatus according to the above mode (10) reduces at least one of the probability of occurrence of a yellow color ink dot and the volume of a yellow color ink used for the yellow color ink dot. On the other hand, a yellow color ink dot tends to emphasize color bleed or spread of an adjacent ink dot of a color lower in lightness than a yellow color.

Therefore, the apparatus according to the above mode (10) suppresses color bleed or spread of an ink dot of a color lower in lightness than a yellow color.

(11) The apparatus according to any one of modes (1)-(10), wherein a first one of the plurality of different colored inks corresponding to the first color-component penetrates a recording medium on which the halftone color image is to be printed by the printer at a speed different from a second one of the plurality of different colored inks corresponding to the second color-component does.

The apparatus according to the above mode (11) suppresses color bleed or spread between two adjacent and different colored ink dots occurring due to the difference therebetween in rate of the penetration into the recording medium (e.g., a recording sheet of paper).

(12) The apparatus according to mode (11), wherein the first ink penetrates the recording medium at a lower speed than the second ink.

(13) The apparatus according to mode (11) or (12), wherein the first ink is a pigment-based ink, and the second ink is a dye-based ink.

The apparatus according to the above mode (13) suppresses color bleed or spread between a pigment-based ink and a dye-based ink, which are different from each other in rate of the penetration into the recording medium (e.g., a recording sheet of paper), and which are prone to color bleed or spread.

(14) A method of forming an image, comprising the steps of:

effecting an n-level quantization for a halftone color image decomposed into a plurality of pixels, on a per pixel basis, the step of effecting the n-level quantization including the step of comparing, for respective separate color-components contained in each pixel, a tone level of the each pixel and at least one threshold value, and quantizing the tone level of the each pixel to produce a discrete value having a plurality of levels (n), with each other, the produced discrete value being indicative of a corresponding one of a plurality of separate states (n) to the each pixel; and forming ink dots using a plurality of different colored inks corresponding to the respective separate color-components, according to the corresponding discrete values produced by the n-level quantization on a per pixel basis, wherein each pixel becomes a subject pixel for which the n-level quantization is to be effected, wherein at least one of the plurality of pixels located in the vicinity of the subject pixel becomes at least one neighboring pixel, and wherein the step of effecting the n-level quantization, for effecting the n-level quantization for each subject pixel, with the at least one neighboring pixel containing a first one of the separate color-components, and with the subject pixel containing a second one of the separate color-components different in color from the first color-component, includes the step of compensating a relationship between the tone level of the second color-component of the subject pixel and the at least one threshold value, such that, as the tone level of the first color-component contained in the at least one neighboring pixel increases, at least one of a probability of occurrence of an ink dot formed at the subject pixel using a corresponding one of the plurality of separate inks to the second color-component contained in the subject pixel, and a volume of the corresponding ink to the second color-component contained in the subject pixel used for forming an ink dot at the subject pixel, decreases.

The method according to the above mode (14) provides basically the same effects as the apparatus according to the above mode (1), according to basically the same principle as the apparatus.

(15) The method according to mode (14), wherein the step of effecting the n-level quantization comprises the step of compensating at least one of the tone level of the second color-component contained in the subject pixel and the at least one threshold value, to thereby compensate the relationship.

The method according to the above mode (15) provides basically the same effects as the apparatus according to the above mode (2), according to basically the same principle as the apparatus.

(16) The method according to mode (14) or (15), wherein the step of effecting the n-level quantization comprises the step of performing the n-level quantization for the halftone color image, such that the tone level of the subject pixel reflects a quantization error occurring due to the n-level quantization effected for the at least one neighboring pixel, and wherein the step of effecting the n-level quantization comprises the step of compensating at least one of the tone level of the second color-component contained in the subject pixel and the quantization error occurring due to the n-level quantization effected for the at least one neighboring pixel, the quantization effort being to be reflected by the tone level of the subject pixel, to thereby compensate the relationship.

The method according to the above mode (16) provides basically the same effects as the apparatus according to the above mode (3), according to basically the same principle as the apparatus.

(17) The method according to any one of modes (14)-(16), wherein the at least one threshold value comprises a plurality of threshold-value sets each having at least one of individual threshold value (n−1), with each set being established for each pixel of the halftone color image, wherein the step of effecting the n-level quantization comprises the step of performing the n-level quantization on a per pixel basis, for each separate color-component, by comparing a corresponding one of the plurality of threshold-value sets to the subject pixel, and the tone level of the subject pixel, with each other, and wherein the step of effecting the n-level quantization comprises the step of compensating at least one of the tone level of the second color-component contained in the subject pixel and the corresponding threshold-value set, to thereby compensate the relationship.

The method according to the above mode (17) provides basically the same effects as the apparatus according to the above mode (6), according to basically the same principle as the apparatus.

(18) The method according to any one of modes (14)-(17), wherein a color of a first one of the plurality of different colored inks corresponding to the first color-component is lower in lightness than that of a second one of the plurality of different colored inks corresponding to the second color-component.

The method according to the above mode (18) provides basically the same effects as the apparatus according to the above mode (8), according to basically the same principle as the apparatus.

(19) The method according to any one of modes (14)-(18), wherein a color of a first one of the plurality of different colored inks corresponding to the first color-component is black.

The method according to the above mode (19) provides basically the same effects as the apparatus according to the above mode (9), according to basically the same principle as the apparatus.

(20) The method according to any one of modes (14)-(19), wherein a color of a second one of the plurality of different colored inks corresponding to the second color-component is yellow.

The method according to the above mode (20) provides basically the same effects as the apparatus according to the above mode (10), according to basically the same principle as the apparatus.

(21) The method according to any one of modes (14)-(20), wherein a first one of the plurality of different colored inks corresponding to the first color-component penetrates a recording medium on which the halftone color image is to be printed by the printer at a speed different from a second one of the plurality of different colored inks corresponding to the second color-component does.

The method according to the above mode (21) provides basically the same effects as the apparatus according to the above mode (11), according to basically the same principle as the apparatus.

(22) The method according to mode (21), wherein the first ink penetrates the recording medium at a lower speed than the second ink.

(23) The method according to mode (21) or (22), wherein the first ink is a pigment-based ink, and the second ink is a dye-based ink.

The method according to the above mode (23) provides basically the same effects as the apparatus according to the above mode (13), according to basically the same principle as the apparatus.

(24) A program executed by a computer for practicing the method according to any one of modes (14)-(23).

Execution of the program according to the above mode (24) by a computer provides substantially the same effects as those of the method according to the above mode (14).

The "program" in the above mode (24) may be interpreted to incorporate not only a combination of instructions implemented by a computer to perform the functions of the program, but also files, data, etc. processed depending on each of the instructions.

Several presently preferred embodiments of the invention will be described in detail by reference to the drawings in which like numerals are used to indicate like elements throughout.

Referring first to FIG. 1, an image forming apparatus 2 constructed according to a first embodiment of the present invention is schematically illustrated in construction.

The image forming apparatus 2 is configured to principally incorporate a computer, including a CPU 12, a ROM 13, and a RAM 15 interconnected via a bus B for allowing communications of control signals and data signals therebetween.

The CPU 12, the ROM 13, and the RAM 15 are electrically coupled via the bus B to an input device in the form of a keyboard 21, an output device in the form of a display 22, an external storage device 23 such as a hard-disk drive and/or a flexible-disk drive, another output device in the form of a color printer 24, etc.

The ROM 13 includes a storage area which is assigned a program storage section 13a. The program storage section 13a stores therein various programs including a basic program required for operating the computer; a page processing program and an error diffusion program both of which will be described later, and other processing program(s), all of which are selectively executed by the CPU 12 when needed.

Alternatively, these various programs may be executed by the CPU 12, such that these various programs are selectively retrieved when needed via the external storage device 23 from a storage medium, such as a flexible disc, an optical-magnetic disc, and/or a CD-ROM, which has therein stored the above various programs, and such that the retrieved program is subsequently stored in a working memory 15f of the RAM 15 for its initiation by the CPU 12.

The RAM 15 includes storage areas which are assigned a threshold-value storage section 15a; an error-distribution-matrix storage section 15b; an error buffer memory 15c; an input-image-data storage section 15d; an output-image-data storage section 15e; the working memory 15f; etc., respectively.

The threshold-value storage section 15a has stored therein a threshold value for use in an error diffusion method. The error-distribution-matrix storage section 15b has stored therein an error diffusion matrix.

Figure 2:
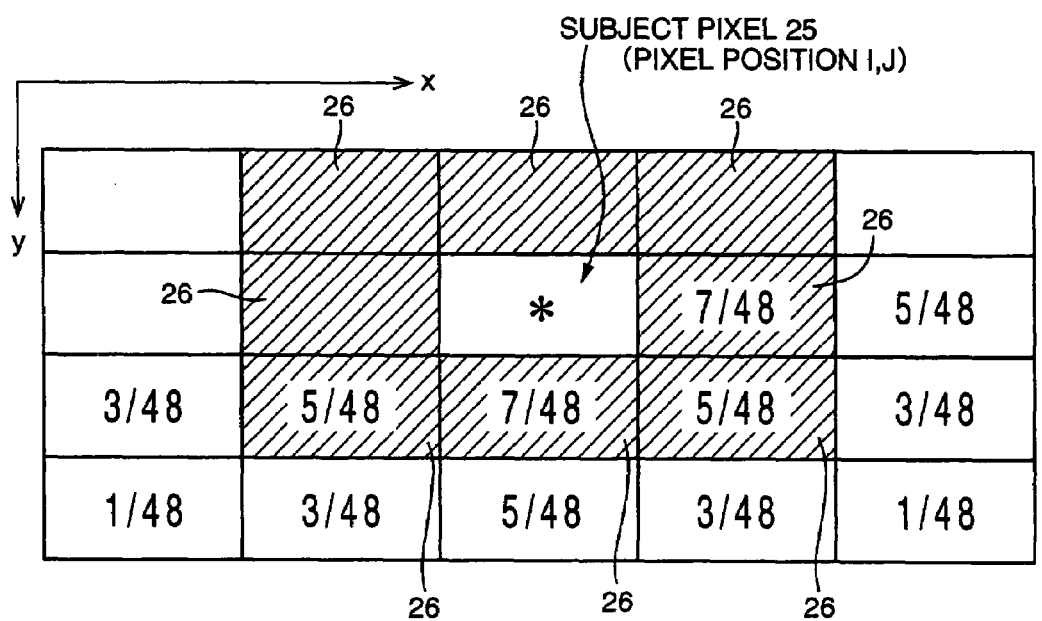
FIG. 2 is a view for explaining in structure an error-distribution matrix prepared for a subject pixel in the first embodiment, the error-distribution matrix being for defining pixels which surround the subject pixel, and to which an error in tone level between an original value and an ultimate value calculated by an error diffusion method is distributed, and for defining what percentages of the error are distributed to the surrounding pixels, respectively.

The error diffusion matrix is formulated to identify, as illustrated in FIG. 2, for each subject pixel 25 of an input image, the distribution of an error in tone level between an original value and an output value calculated by the error diffusion method (including a quantization process in the form of a binarization process, for example), into surrounding pixels of the same input mage surrounding the each subject pixel 25.

In FIG. 2, these surrounding pixels are denoted by the respective rectangles, near the half of which are filled in with the respective fractions (for clarity, the illustration in FIG. 2 is partially omitted because of the symmetry). More specifically, the error diffusion matrix defines to which surrounding pixels the quantization error of the subject pixel 25 is distributed, and defines what percentages of the quantization error of the subject pixel 25 are distributed to the surrounding pixels, respectively. In FIG. 2, the fractions represent the respective distribution percentages in association with the respective surrounding pixels. These surrounding pixels are stored in the error buffer memory 15c.

The error buffer memory 15c has stored therein divisions of the error of the subject pixel 25 which are assigned to the respective surrounding pixels. The input-image-data storage section 15d has stored therein halftone-color-image data introduced from the external storage device 23 or the like, for respective color planes of an input image corresponding to respective color-components (principal colors): Cyan, Magenta, Yellow, and Black (hereinafter, abbreviated "C," "M," "Y," and "K," respectively), on a per color-plane basis. A tone level of each principal color ranges from "0" to "255." A halftone color image is decomposed into C, M, Y, and K color planes.

Figure 3:
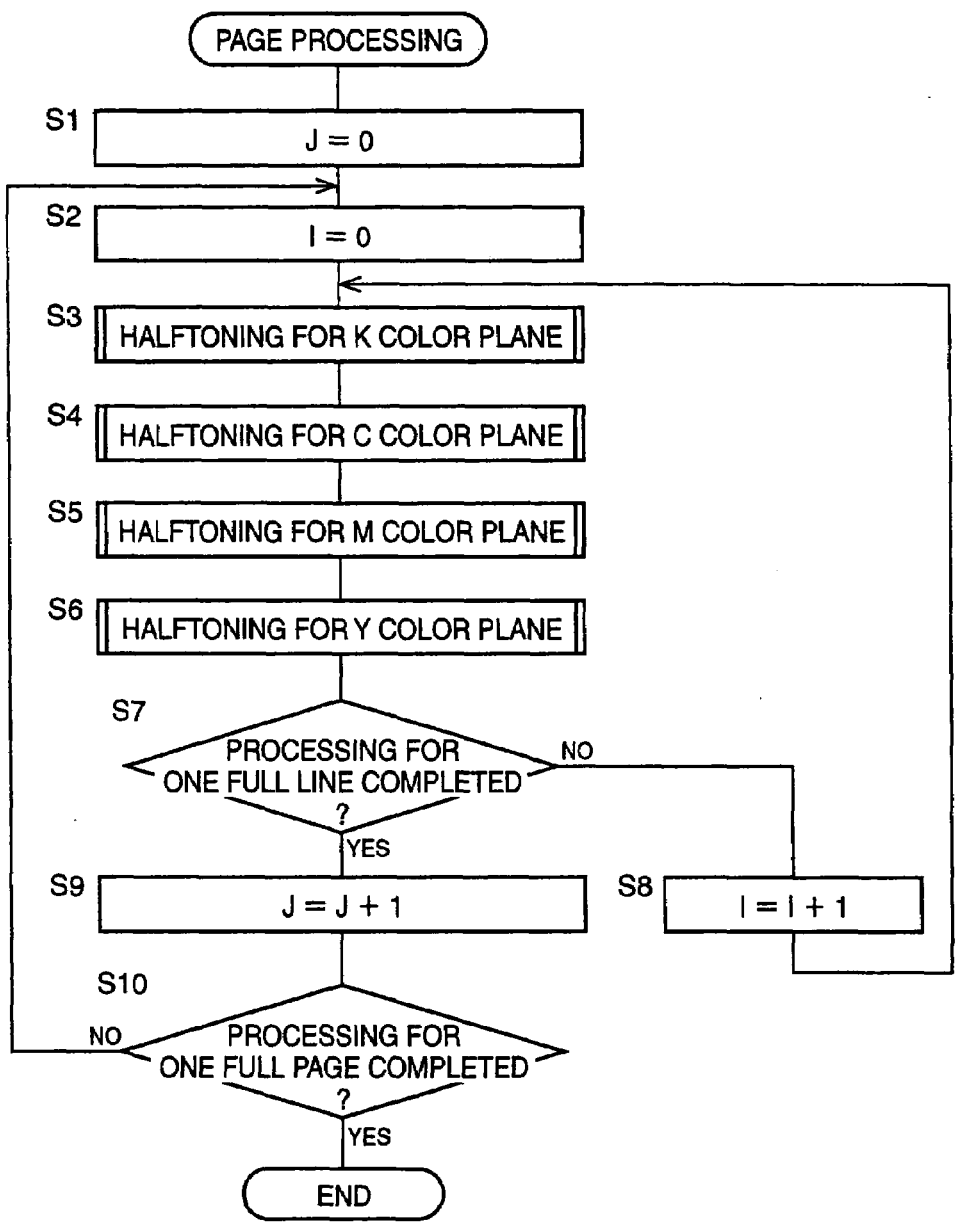
FIG. 3 schematically illustrates in flow chart a program executed by a computer for implementing a page processing in the first embodiment.

The output-image-data storage section 15e is for storage of digital-halftone-image data obtained as a result of a binarization of the halftone-color-image data stored in the input-image-data storage section 15d through a page processing (see FIG. 3). The digital-halftone-image is displayed by the display 22 or printed by the color printer 24, when needed.

The color printer 24 is configured to print a digital halftone image according to the corresponding digital-halftone-image data stored in the output-image-data storage section 15e, with an on dot or an off dot, in an inkjet manner.

Referring next to FIG. 3, there is schematically illustrated in flow chart the aforementioned page processing program executed by the CPU 12 for implementing the aforementioned page processing. With reference to FIG. 3, the page processing will be described.

The page processing is performed for the binarization of the halftone-color-image data stored in the input-image-data storage section 15d thereby producing the corresponding digital-halftone-image data.

Upon entry into the page processing, a step S1 is implemented to initialize to "0" a variable "J," i.e., one of variables together defining the two-dimensional position of a pixel to be binarized, and a step S2 is subsequently implemented to initialize to "0" a variable "I," i.e., the counterpart of the variables. The variable "I" represents the position of a pixel with respect to a main scanning direction (x-axis direction as shown in FIG. 2), while the variable "J" represents the position of the pixel with respect to a sub-scanning direction (y-axis direction as shown in FIG. 2). The pixel identified by a combination of the variables "I" and "J" is referred to as "subject pixel 25," as shown in FIG. 2.

The step S2 is followed by a step S3 to perform a halftoning for the K color plane. More specifically, the step S3 is implemented to compensate an input tone level of the subject pixel 25 in the K color plane, based on the error which has been retrieved from the error buffer memory 15c with respect to the subject pixel 25. The error retrieved with respect to the subject pixel 25 has been derived from the proceeding error diffusion process for the corresponding surrounding pixels.

The step S3 is further implemented to compare the tone level obtained as a result of the compensation, and the aforementioned threshold value, with each other, and to set, depending on the result of the comparison, an output or ultimate tone level of the subject pixel 25 in the K color plane to "0 (off dot)" or "1 (on dot)." The output tone level is stored as binary image data of the K color plane in the output-image data storage section 15e, each time the step S3 is implemented for the binarization.

The step S3 is followed by a step S4 being implemented for the halftoning for the C color plane in a similar manner to the step S3. More specifically, the step S4 is implemented to establish an output tone level of the subject pixel 25 in the C color plane, and store the output tone level in the output-image data storage section 15e for producing binary image data of the C color plane.

The step S4 is followed by a step S5 being implemented for the halftoning for the M color plane in a similar manner to the steps S3 and S4. More specifically, the step S5 is implemented to establish an output tone level of the subject pixel 25 in the M color plane, and store the output tone level in the output-image data storage section 15e for producing binary image data of the M color plane.

The step S5 is followed by a step S6 to perform the halftoning for the Y color plane as described later, to thereby establish an output tone level of the subject pixel 25 in the Y color plane, and store the output tone level in the output-image data storage section 15e for producing binary image data of the Y color plane.

The step S6 is followed by a step S7 to determine whether or not the binarization has been completed for one full line of the input image along the main scanning direction (the x-axis direction as shown in FIG. 2).

If the binarization has not yet been completed for the current full line of the input image, then the determination of the step S7 becomes negative "NO." The execution proceeds to a step S8 to increment by one the current value of the variable "I," i.e., the position of the subject pixel 25 with respect to the main scanning direction. Thereafter, the execution loops back to the step S3 for repeating the above-described corresponding processing.

Alternatively, if the binarization has been completed for the current full line of the input image, then the determination of the step S7 becomes affirmative "YES." The execution proceeds to a step S9 to increment by one the current value of the variable "J," i.e., the position of the subject pixel 25 with respect to the sub-scanning direction, and then proceeds to a step S10.

The step S10 is implemented to determine whether or not the binarization has been completed for the overall number of pixels in the current page of the input image. If the binarization has not yet been for the current full page, then the determination of the step S10 becomes negative "NO," and thereafter, the execution loops back to the step S2 for repeating the above-described corresponding processing.

Figure 4:
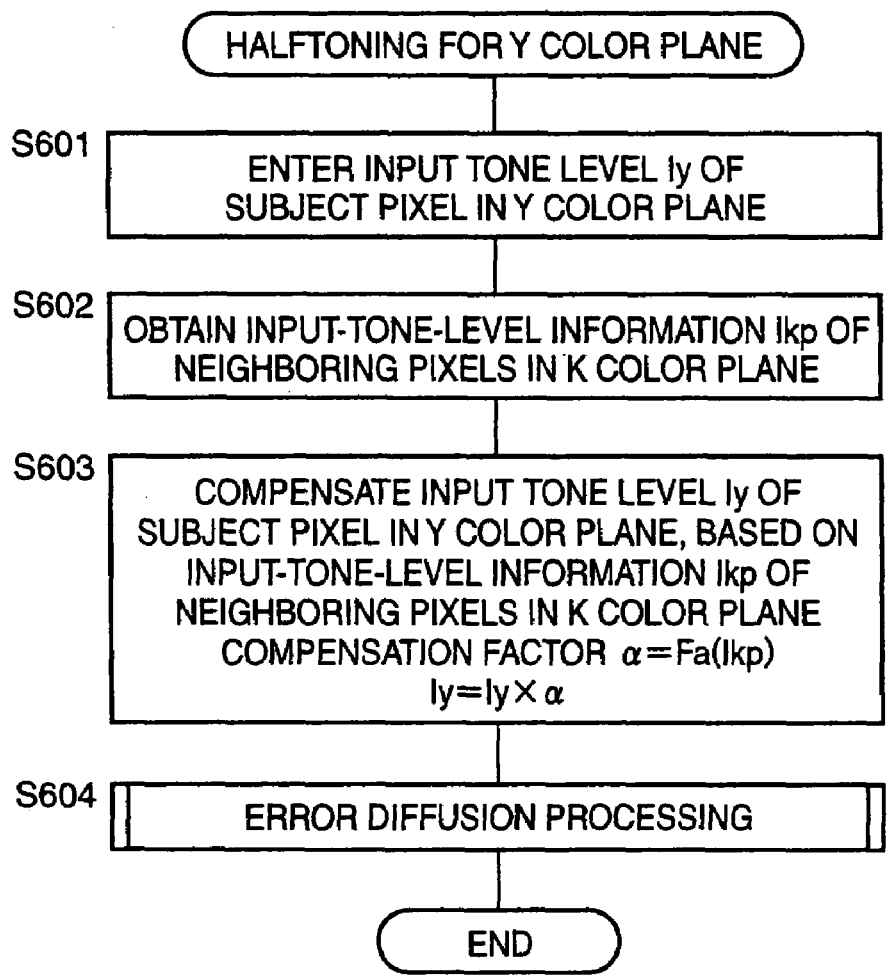
FIG. 4 schematically illustrates in flow chart the detail of a step S6 indicated in FIG. 3 in the name of a halftoning routine for Y color plane.

Upon completion of the binarization for the K, C, M, and Y color planes of one full page of the input image and the storing of the corresponding binary image data in the output-image-data storage section 15e as the digital-halftone-image data, one cycle of the page processing is terminated Referring next to FIG. 4, there is schematically illustrated in flow chart the detail of the step S6 shown in FIG. 3, i.e., the halftoning for the Y color plane, in the name of a halftoning routine for Y color plane.

Upon entry into the halftoning routine for Y color plane, a step S601 is implemented to retrieve an input tone level Iy of the subject pixel 25 in the Y color plane. The step S601 is followed by a step S602 to retrieve input-tone-level information Ikp of neighboring pixels 26 in the K color plane.

By definition, the neighboring pixels 26, belonging to the aforementioned surrounding pixels shown in FIG. 2, are located to leave a distance from the subject pixel 25, long enough to allow ink dots formed corresponding to the neighboring pixels 26 to be overlapped at least in part with an ink dot formed corresponding to the subject pixel 25. The selection of the neighboring pixels 26 depends on the size of an ink droplet, the printing resolution, the type of the recording medium to be printed, etc. In the present embodiment, as illustrated by hatching in FIG. 2, eight pixels 26 at the periphery of the subject pixel 25 are selected to be the neighboring pixels 26.

By definition, the input-tone-level information Ikp of the neighboring pixels 26 in the K color plane represents a maximum or otherwise an average, of the input tone levels of the eight neighboring pixels 26 in the K color plane.

The step S602 is followed by a step S603 to determine a compensation factor α depending on the input-tone-level information Ikp of the neighboring pixels 26 in the K color plane obtained in the step S602.

Figure 5:
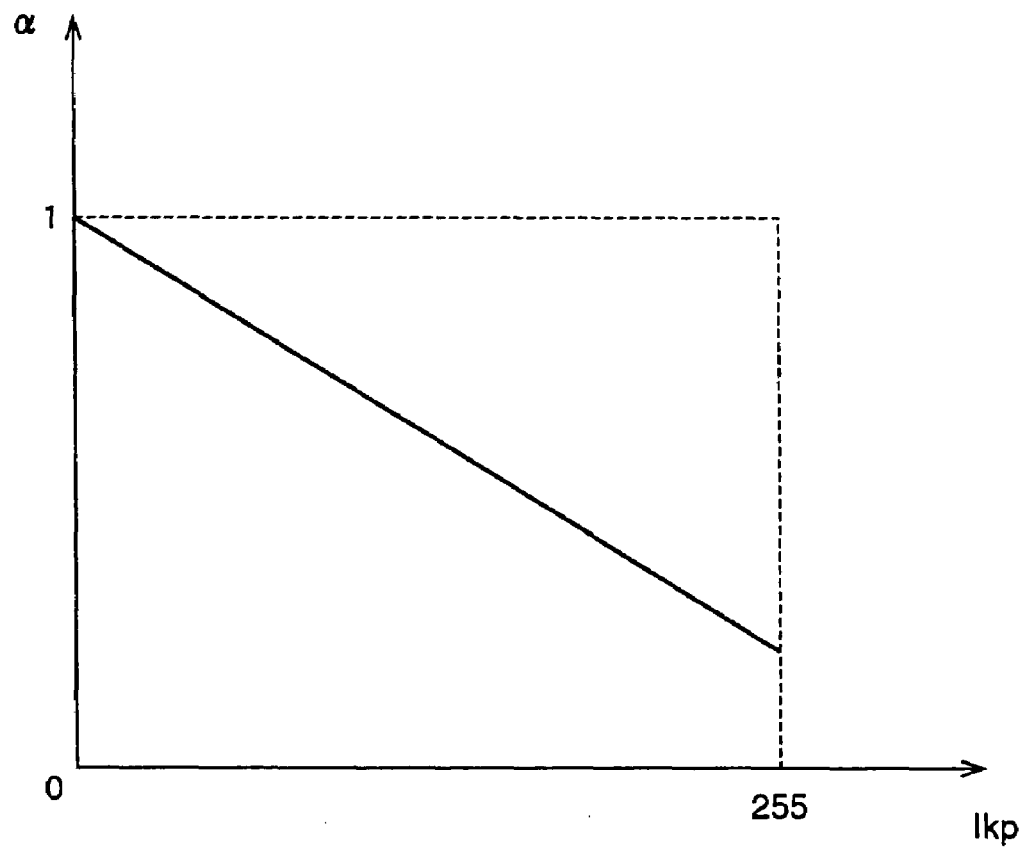
FIG. 5 is a graph for explaining a table to be looked up for obtaining a compensation factor $\alpha$ based on input-tone-level information Ikp of the neighboring pixels in a K color plane, in a step S603 indicated in FIG. 4.

FIG. 5 illustrates in graph a table to be looked up for determining the compensation factor α depending on the input-tone-level information Ikp of the neighboring pixels 26 in the K color plane. As illustrated in FIG. 5, the table is formulated, such that, as the input-tone-level represented by the input-tone-level information Ikp of the neighboring pixels 26 in the K color plane increases, the compensation factor α decreases.

As illustrated in FIG. 5, the compensation factor α is a function of a value represented by the input-tone-level information Ikp, and the relationship therebetween is denoted by the following expression as shown in FIG. 4:

$$\alpha=Fa(Ikp).$$

The S603 is further implemented to compensate and update the input tone level Iy of the subject pixel 25 in the Y color plane, by multiplying the original value of the input tone level Iy by the compensation factor α determined according to the table shown in FIG. 5.

More specifically, the input tone level Iy of the subject pixel 25 in the Y color plane is compensated such that, as the input tone level represented by the input-tone-level information Ikp of the neighboring pixels 26 in the K color plane increases, the compensated input-tone-level Iy decreases.

Following the step S603, its compensation allows a step S604 to be implemented for performing an error diffusion process such that, as the input-tone-level represented by the input-tone-level information Ikp of the neighboring pixels 26 in the K color plane increases, there decreases the probability that the tone level Iy of the subject pixel 25 in the Y color plane is binarized into "1 (on dot)," and that an ink dot is accordingly formed corresponding to the subject pixel 25 in the Y color plane.

Figure 6A:
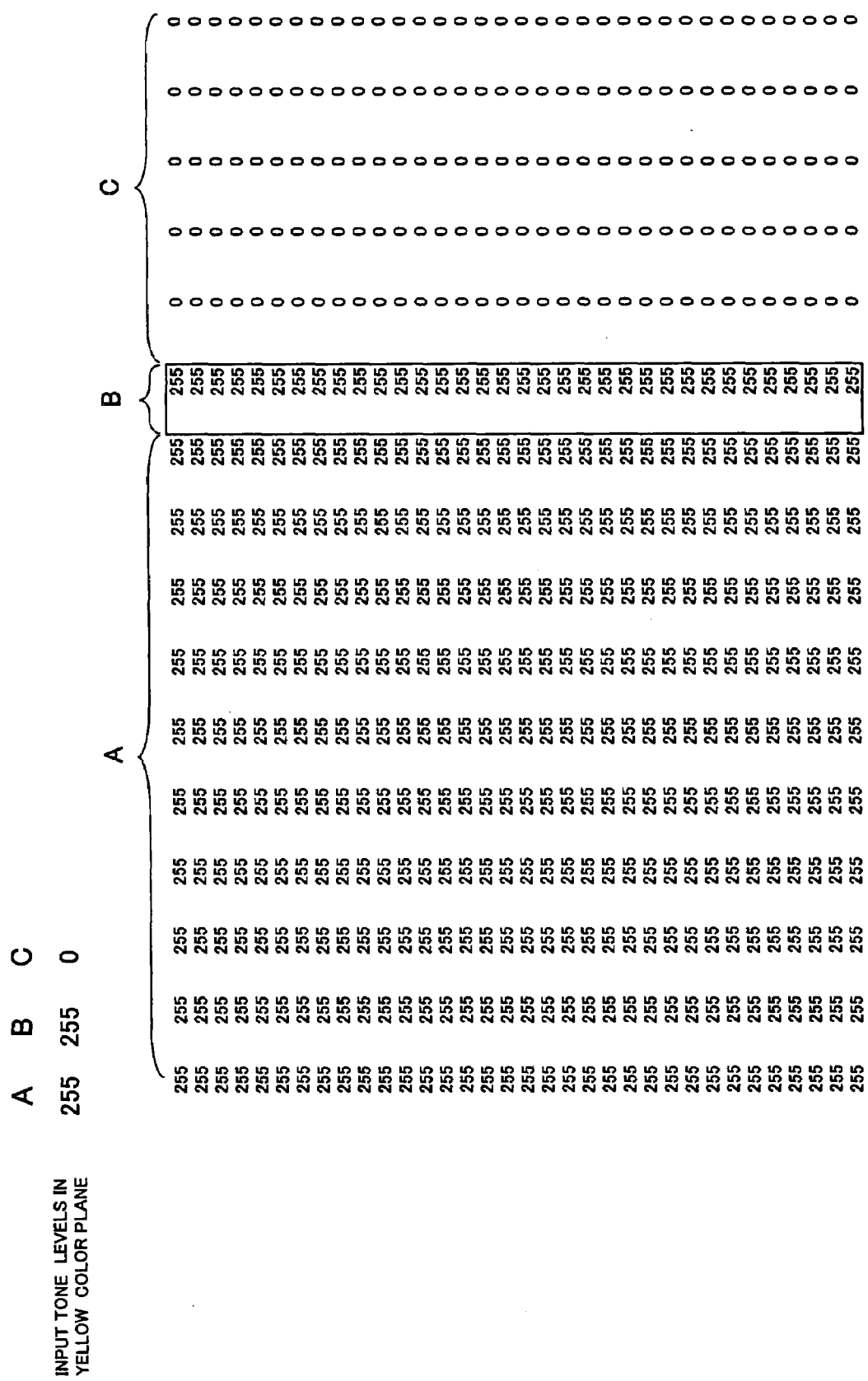
FIG. 6A illustrates an example of a set of input tone levels Iy in a Y color plane.

FIG. 6A illustrates an example of the input tone levels Iy in the Y color plane of an input image, while FIG. 6B illustrates the tone levels Iy calculated by the error diffusion method in the example shown in FIG. 6A.

As illustrated in FIGS. 6A and 6B, the input image is divided into a region A which is a Y color solid region with the input tone levels Iy in the Y color plane being all coincident with "255," a region B which is also a Y color solid region, and a region C which is a K color solid region with the input tone levels Iy in the Y color plane being all coincident with "0." The region B forms a boundary portion of a combined area of the Y color solid regions A and B separating it from the K color solid region C.

Although not illustrated in FIG. 6, the input tone levels in the K color plane are all "0" in the regions A and B, while "255" in the region C.

During the binarization process of the Y color plane shown in FIG. 6A using the halftoning process for the Y color plane (see FIG. 4) in the present embodiment, if the compensation factor α for the region B adjacent to the K color solid region C is determined for example as "0.25," the input tone levels of pixels in the region B in the Y color plane is compensated from "255" to "64." Subsequently, the error diffusion method is implemented based on the thus-compensated input-tone-levels Iy (see the step S604 in FIG. 4). As a result, as shown in FIG. 6B, the probability of occurrence of a Y color ink dot formed in the region B decreases, so that the total number of Y color ink dots formed in the region B becomes near a quarter of that obtained when the input tone levels Iy are not compensated in the above manner.

The image forming apparatus 2 constructed according to the present embodiment performs the binarization with the input tone level Iy of the subject pixel 25 in the Y color plane being compensated such that, as the corresponding neighboring pixels 26 in the vicinity of the subject pixel 25 in the Y color plane to be binarized increase in input tone level, the probability of occurrence of Y color ink dots in the recording medium decreases.

For this reason, the image forming apparatus 2, upon practiced in the case where the nearby pixels of the subject pixel 25 in the K color plane are high in input level, reduces the area in which a K color ink region and a Y color ink region are brought into contact with each other, contributing to a suppression in color bleed in which an ink dot formed with a K color ink spreads or migrates over a nearby ink dot formed with a Y color ink.

The image forming apparatus 2 according to the present embodiment performs the compensation of the input tone level Iy ("0"-"255") contained in the subject pixel 25 in the Y color plane, depending on the input tone levels of the neighboring pixels 26 located nearby the subject pixel 25, and performs the binarization of the compensated tone level Iy of the subject pixel 25.

For this reason, the image forming apparatus 2 allows the control of the percentage of the number of off dots selected for suppressing the color bleed or spread, so as to reflect the states in tone level of the neighboring pixels 26 located in the vicinity of the subject pixel 25 in a relatively faithful manner, as compared with where the input tone level of the subject pixel 25 is binarized to produce binary data ("0" or "1") of the subject pixel 25, and where the produced binary data is subsequently compensated depending on the tone levels of the neighboring pixels 26.

As a result, the image forming apparatus 2 permits the formation of an image enhanced in quality while suppressing color bleed or spread.

The image forming apparatus 2 according to the present embodiment performs the compensation of the input tone level Iy of the subject pixel 25 in the Y color plane depending on the input tone levels of the neighboring pixels 26 in the vicinity of the subject pixel 25 in the K color plane, and performs the binarization of the compensated tone level Iy, with the binarization for the neighboring pixels 26 being effected so as to reflect the error in tone level occurring due to the binarization for the subject pixel 25.

Therefore, the image forming apparatus 2 allows the overall and average value of the tone levels or densities (the distribution density of Y color ink dots printed) in a boundary region separating a K color region and a Y color region in an image, measured by viewing the whole image, to be adjusted depending on the input tone levels of the neighboring pixels 26 in the K color plane.

As a result, the image forming apparatus 2 permits the formation of an image enhanced in quality while suppressing color bleed or spread.

In the above description of the present embodiment, the phrase "nearby pixels of the subject pixel 25 in the K color plane are high in tone level" has been used to mean that "the input tone levels contained in the neighboring pixels 26 in the K color plane are absolutely high." In this case, if the input tone level of one of the neighboring pixels 26 is higher than a reference value predetermined without depending on the input tone levels of the subject pixel 25, then the one neighboring pixel 26 is determined to be absolutely high in tone level.

Alternatively, the above phase may be used to mean that "the input tone levels contained in the neighboring pixels 26 in the K color plane are relatively high to the input tone level contained in the subject pixel 25 in the K color plane."

For the present embodiment to be practiced such that, as the input tone levels of the neighboring pixels 26 in the K color plane are relatively high to the input tone level of the subject pixel 25 in the K color plane, the probability of occurrence of Y color ink dots at the subject pixel 25 decreases, the input-tone-level information Ikp of the neighboring pixels 26 in the K color plane may be determined to be equal to a value obtained using the following equation (1) or (2):

$$Ikp = MAX(\text{neighboring pixels}) - INPUT(\text{subject pixel}) \quad (1)$$

$$Ikp = AVE(\text{neighboring pixels}) - INPUT(\text{subject pixel}) \quad (2)$$

where:

MAX(neighboring pixels)=a maximum of the input tone levels of the neighboring pixels 26 in the K color plane;

AVE(neighboring pixels)=the average of the input tone levels of the neighboring pixels 26 in the K color plane; and INPUT(subject pixel)=the input tone level of the subject pixel 25 in the K color plane.

Figure 7:
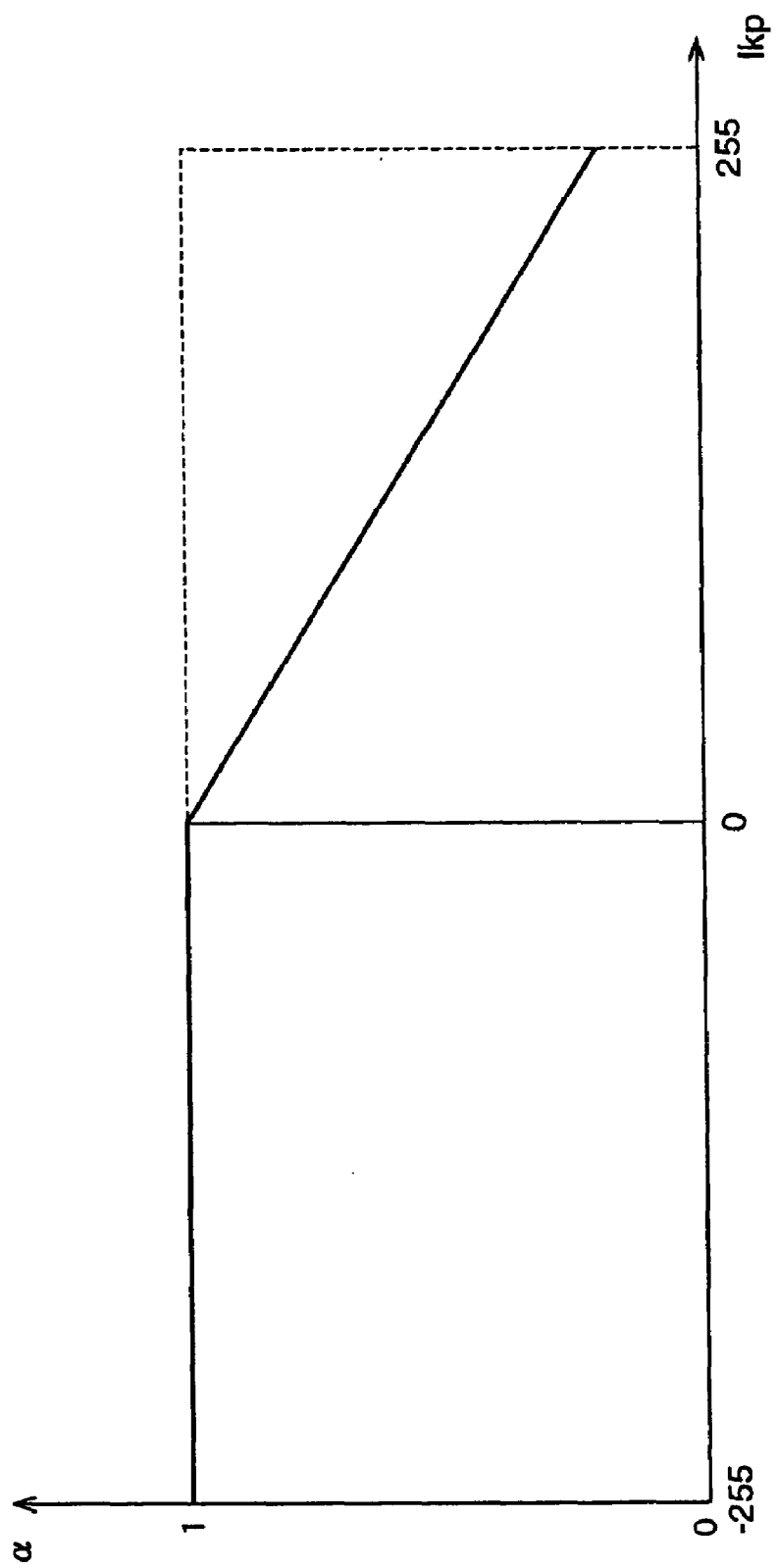
FIG. 7 is a graph for explaining a table to be looked up for obtaining the compensation factor $\alpha$ based on the input-tone-level information Ikp of the neighboring pixels in a K color plane, the input-tone-level information Ikp being obtained using an equation (1) or (2)

FIG. 7 illustrates in graph a table to be looked up for the compensation factor α depending on the input-tone-level information Ikp of the neighboring pixels 26 in the K color plane derived from the equation (1) or (2). The value represented by the input-tone-level information Ikp in FIG. 7 ranges between "-255" and "255" via "0," which is expanded from that in FIG. 5 ranging between "0" and "255."

As illustrated in FIG. 7, the table is formulated to achieve the relationship that, as the input tone levels of the neighboring pixels 26 in the K color plane become relatively high to the input tone level of the subject pixel 25 in the K color plane, the compensation factor α becomes smaller, and that, in the region with the input tone levels of the neighboring pixels 26 in the K color plane being negative, the compensation factor α becomes "1."

Figure 8A:
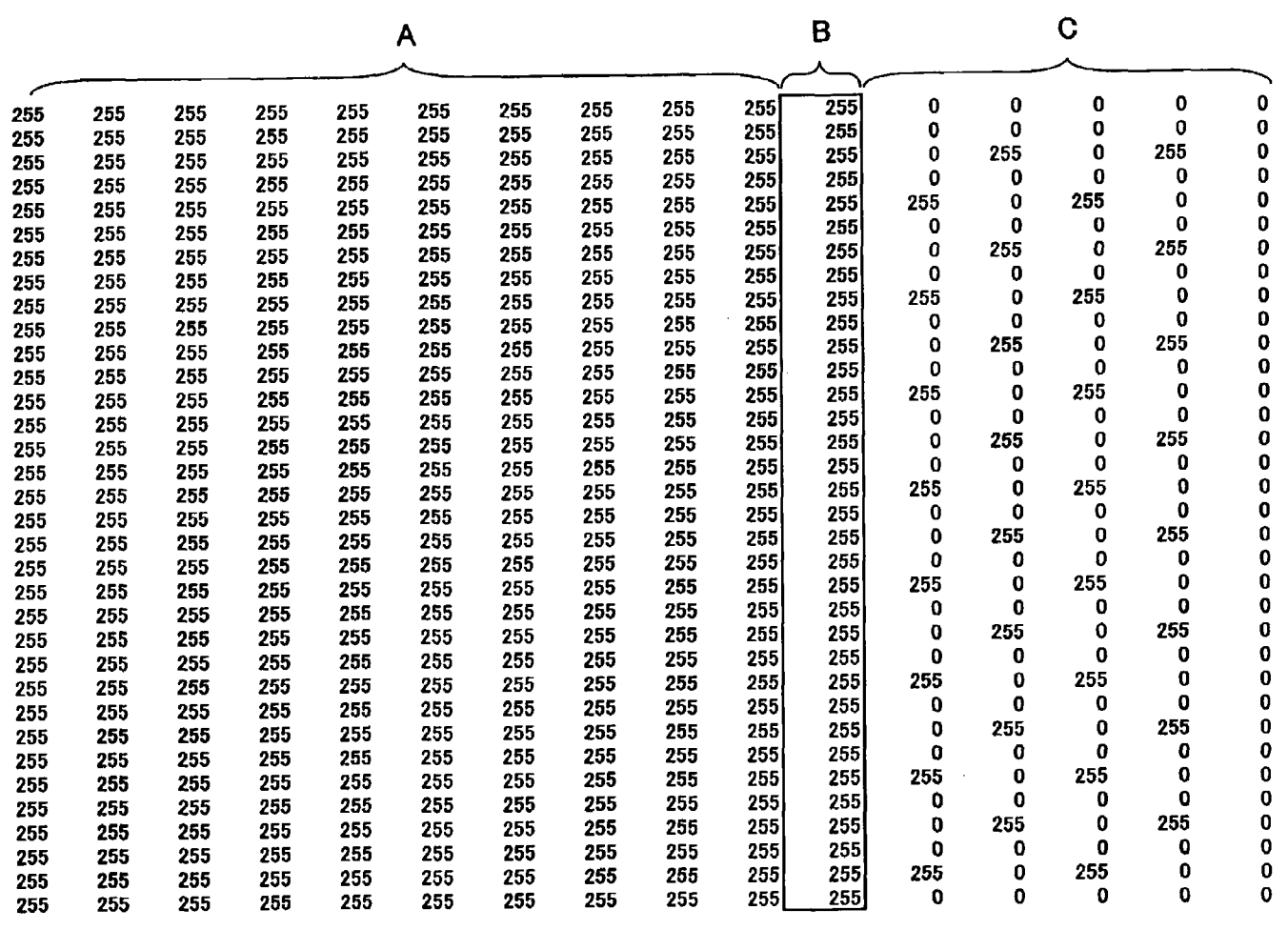
Figure 8B:
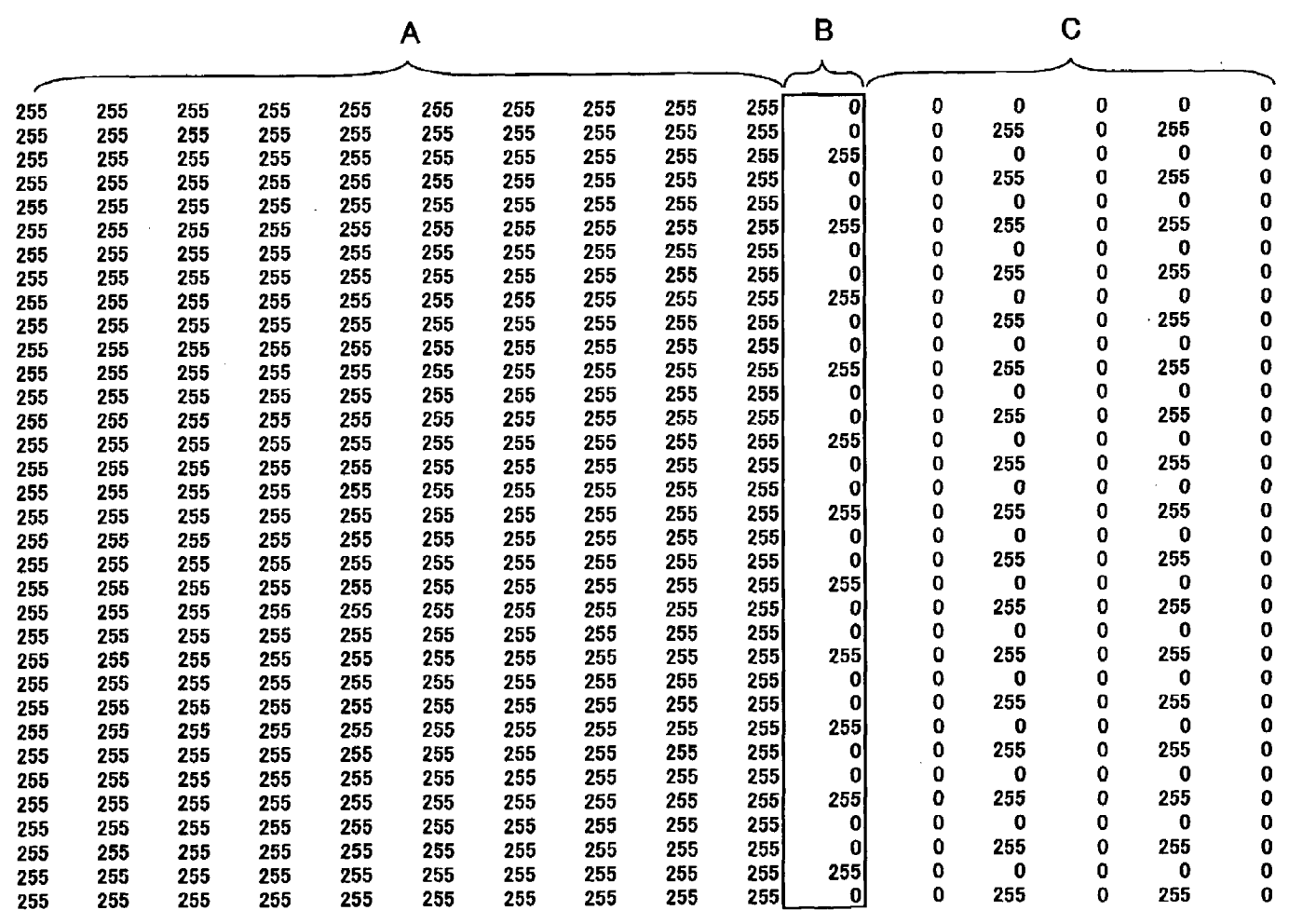

FIGS. 8A and 8B are prepared for explanation of the compensation of the input tone level Iy of the subject pixel 25 using the compensation factor α determined according to the above table shown in FIG. 7. More specifically, FIG. 8A illustrates the input tone levels in the Y color plane of an input image prior to the compensation for the Y color plane, which is similar to FIG. 6A, while FIG. 8B illustrates the tone levels in the Y color plane of the same input image after the compensation for the Y color plane, which is similar to FIG. 6B.

The example illustrated in FIGS. 8A and 8B is different from the example illustrated in FIGS. 6A and 6B, in that pixels each having an input tone level of "255" in the Y color plane are present in the region C illustrated in FIGS. 8A and 8B, for allowing Y color ink dots to be printed even in the K color solid region C to play a role of a fixing additive for enhancing a fixing ability of a K color ink to the recording medium.

By the use of the compensation factor α determined according to the table shown in FIG. 7, the input tone levels Iy in the Y color plane illustrated in FIG. 8A are compensated from "255" to for example "64," only in a region of the Y color plane that has a larger difference in input tone level in the K color plane between the subject pixel 25 and the neighboring pixels 26. Such a region is the yellow color region B adjacent to the black color solid region C.

Upon binarization of the compensated input-tone-levels Iy by the error diffusion method (in the step S604 shown in FIG. 4), the number of Y color ink dots is reduced to about a quarter of the original, only in the region B, while being kept almost unchanged in the region C.

More specifically, the cooperative employment of the above equation (1) or (2) and the table illustrated in FIG. 7 causes the compensation factor α to become "1," provided that there is a coincidence between the subject pixel 25 and the neighboring pixels 26 with regard to the input-tone-level in the K color plane, and, as a result, there are kept unchanged even after the compensation (Iy=Iy×α), the input tone levels Iy in the Y color plane in the K color solid region (region C), and eventually the number of the K color ink dots formed in the K color solid region (region C).

Therefore, the present embodiment, when a Y color ink dot is employed as a fixing additive in a K color solid region, allows an adequate improvement in the ability of a K color ink to be fixed to the K color solid region.

As will be readily understood from the above, in the present embodiment, a portion of the aforementioned computer which is assigned to implement the halftoning for the Y color plane illustrated in flow chart in FIG. 4 constitutes an example of the "n-level quantizer" set forth in the above mode (1).

Next, a second embodiment of the present invention will be described with reference to FIG. 9.

The present embodiment is basically common to the first embodiment, but differs from the first embodiment in that a tone level error e calculated by the error diffusion method is compensated in the halftoning for the Y color plane (in the step S6 shown in FIG. 3).

In the error diffusion method, an error in tone level between the original value and the binarized value for each pixel is calculated, and distributions of the calculated error to the nearby pixels are subsequently calculated. For each pixel, a plurality of distributions provided from the respective nearby pixels are accumulated, and the sum of them is assigned to the each pixel. For each pixel, the accumulated distributions are stored in the error buffer memory 15c.

The above "error e" is used to mean the sum of the errors accumulated for each pixel, which will be also "assigned error."

In view of the above, only the halftoning for the Y color plane in the present embodiment will be described below in more detail, for better understanding the present embodiment, while common elements of the present embodiment to those of the first embodiment will be referenced the same reference numerals or names as those in the description and illustration of the first embodiment, without a redundant description and illustration.

Figure 9:
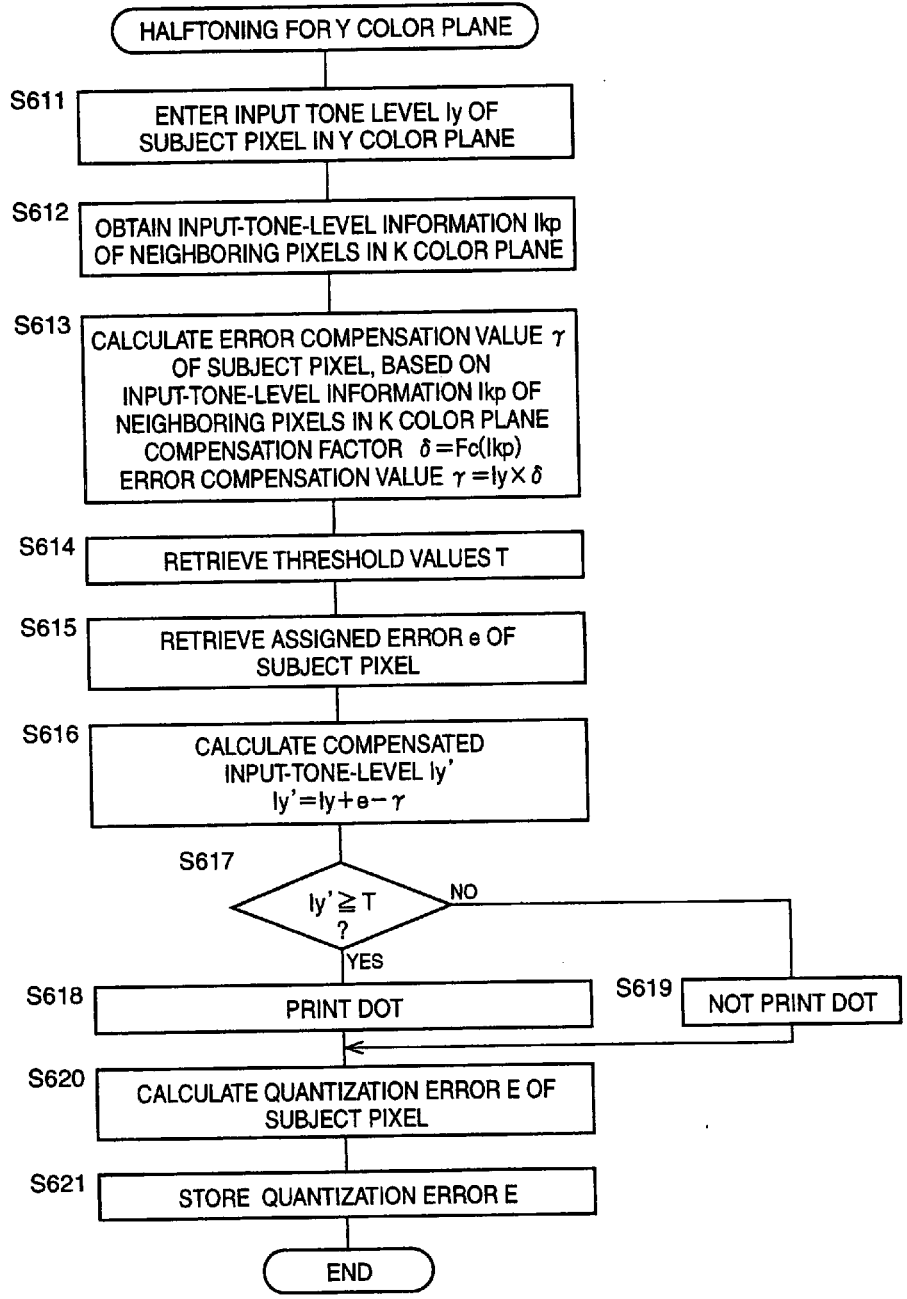
FIG. 9 schematically illustrates in flow chart a halftoning routine for Y color plane in an image forming apparatus according to a second embodiment of the present invention, FIG. 9 being similar to FIG. 4.

Referring now to FIG. 9, there is schematically illustrated in flow chart a halftoning (in the step S6 shown in FIG. 3) for the Y color plane in the present embodiment. The flow chart in FIG. 9 is similar to that in FIG. 4.

Upon entry into the halftoning for the Y color plane, a step S611 is implemented to retrieve the input tone level Iy of the subject pixel 25 in the Y color plane. The step S611 is followed by a step S612 to retrieve the input-tone-level information Ikp of the neighboring pixels 26 in the K color plane.

By definition, the input-tone-level information Ikp of the neighboring pixels 26 in the K color plane represents a maximum or otherwise an average, of the input tone levels of the eight neighboring pixels 26 in the K color plane.

The step S612 is followed by a step S613 to determine a compensation factor 6 depending on the input-tone-level information Ikp of the neighboring pixels 26 in the K color plane obtained in the step S612.

Figure 10:
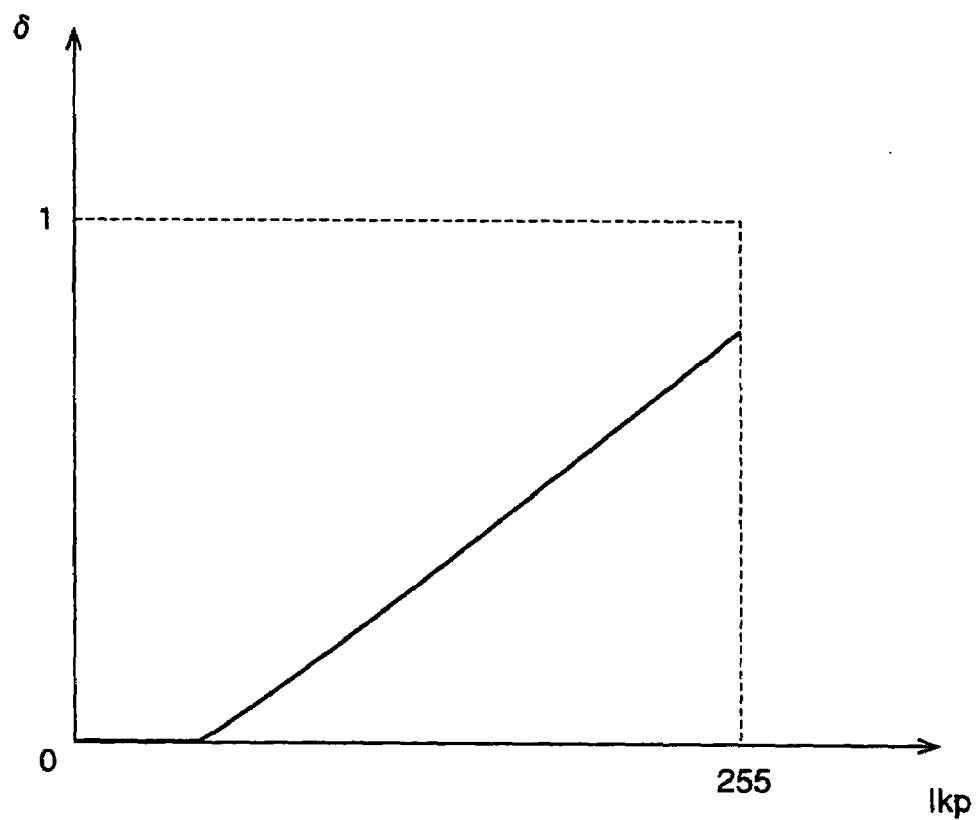
FIG. 10 is a graph for explaining a table to be looked up for obtaining a compensation factor δ based on input-tone-level information Ikp of the neighboring pixels in a K color plane, in a step S613 indicated in FIG. 9.

FIG. 10 illustrates in graph a table to be looked up for determining the compensation factor δ depending on the input-tone-level information Ikp of the neighboring pixels 26 in the K color plane. As illustrated in FIG. 10, the table is formulated, such that, as the input-tone-level represented by the input-tone-level information Ikp of the neighboring pixels 26 in the K color plane increases, the compensation factor δ increases.

As illustrated in FIG. 10, the compensation factor δ is a function of a value represented by the input-tone-level information Ikp, and the relationship therebetween is denoted by the following expression as shown in FIG. 9:

$$\delta = Fc(Ikp).$$

The step S613 is further implemented to calculate an error compensation value γ from both the compensation factor δ determined according to the table illustrated in FIG. 10 and the input tone level Iy. The calculation is made as follows:

$$\gamma = Iy \times \delta.$$

The step S613 is followed by a step S614 to retrieve a threshold value T from the threshold-value storage section 15a. Illustratively, the threshold value T is set to for example "128." The step S614 is followed by a step S615 to retrieve from the error buffer memory 15c the total tone level error e previously stored therein in association with the subject pixel 25.

Thereafter, a step S616 is implemented to subtract the error compensation value γ calculated in the step S613, from the original tone level Iy of the subject pixel 25 in the Y color plane, and to subsequently add to the result of the calculation, the assigned error e retrieved in the step S615, to thereby calculate a compensated input-tone-level Iy'.

As a result, as the error compensation value γ increases, i.e., as the input-tone-level information Ikp of the neighboring pixels 26 in the K color plane increases, the compensated input-tone-level Iy' decreases.

Thereafter, a step S617 is implemented to determine whether or not the compensated input-tone-level Iy' obtained in the step S616 is not lower than the threshold value T. If the compensated input-tone-level Iy' is lower than the threshold value T, then the determination becomes negative "NO." The execution proceeds to a step S619 to set an output density level of the subject pixel 25 to an off state, not to print a dot at the subject pixel 25.

Alternatively, if the compensated input-tone-level Iy' is not lower than the threshold value T, then the determination of the step S617 becomes affirmative "YES." The execution proceeds to a step S618 to set an output density level of the subject pixel 25 to an on state, to print a dot at the subject pixel 25.

Each cycle of the implementation of a corresponding one of the steps S618 and S619, the thus-set output density level is stored in the output-image-data storage section 15e to produce binary image data of the Y color plane, Thereafter, a step S620 is implemented to subtract dot output information, i.e., the output density level ("0" for an off dot or "255" for an on dot), from the compensated input-tone-level Iy', to thereby calculate a subject-pixel error E. The step S620 is followed by a step S621 to store the calculated subject-pixel error E in the error buffer memory 15c.

Then, one cycle of the execution of the halftoning for the Y color plane illustrated in FIG. 9 is terminated.

Figure 11:
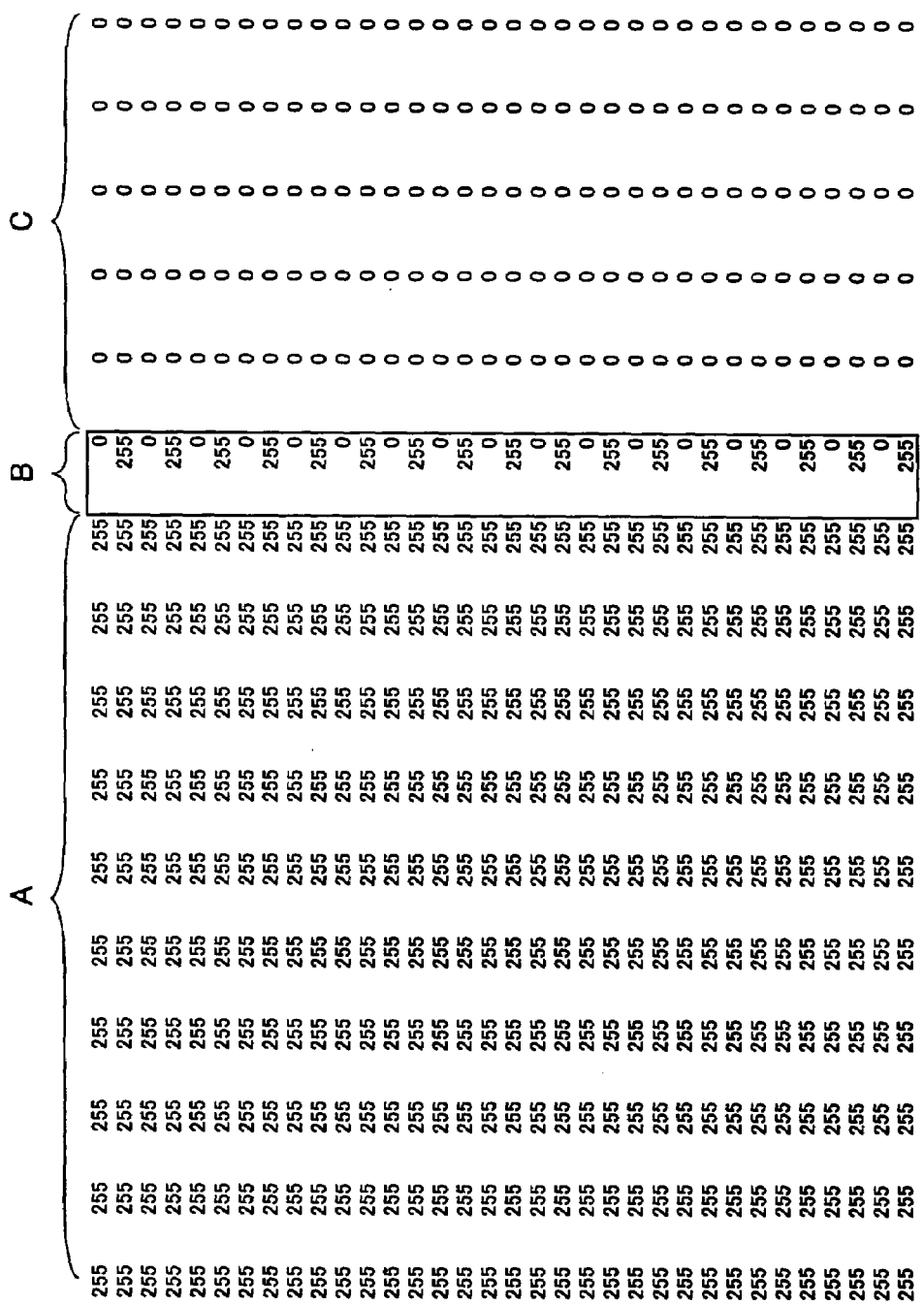
FIG. 11 illustrates an example of a set of ultimate tone levels or density values in a Y color plane calculated by the error diffusion method in the second embodiment.

FIG. 11 illustrates in graph the tone levels in the Y color plane after the error diffusion. In FIG. 11, a region A is a Y color solid region, a region B is also a Y color solid region, and a region C is a K color solid region. The region B forms a boundary portion of a combined area of the Y color solid regions A and B separating it from the K color solid region C.

Although not illustrated in FIG. 11, the input tone levels in the K color plane are all "0" in the regions A and B, while "255" in the region C.

Once the present embodiment is practiced in the example shown in FIG. 6A using the error diffusion, the error compensation values γ of the pixels in the region B are each calculated as for example "128," based on the input-tone-level information Ikp of the neighboring pixels 26 in the K color plane, resulting in the compensated input-tone-levels Iy' being each calculated as "128" only in the region B. FIG. 11 illustrates the tone levels calculated by the error diffusion based on the compensated input-tone-levels Iy'.

As shown in FIG. 11, the halftoning for the Y color plane in the present embodiment allows the production of binary image data for the Y color plane in a similar manner to the first embodiment, resulting in the achievement of the similar advantages to the first embodiment.

In the present embodiment, the processing in the step 5612 (see FIG. 8) is performed such that a maximum or an average of the input tone levels of the eight neighboring pixels 26 in the K color plane are used to produce the input-tone-level information Ikp of the neighboring pixels 26 in the K color plane.

Alternatively, a value obtained using the equation (1) or (2) may be used to produce the input-tone-level information Ikp of the neighboring pixels 26 in the K color plane.

Figure 12:
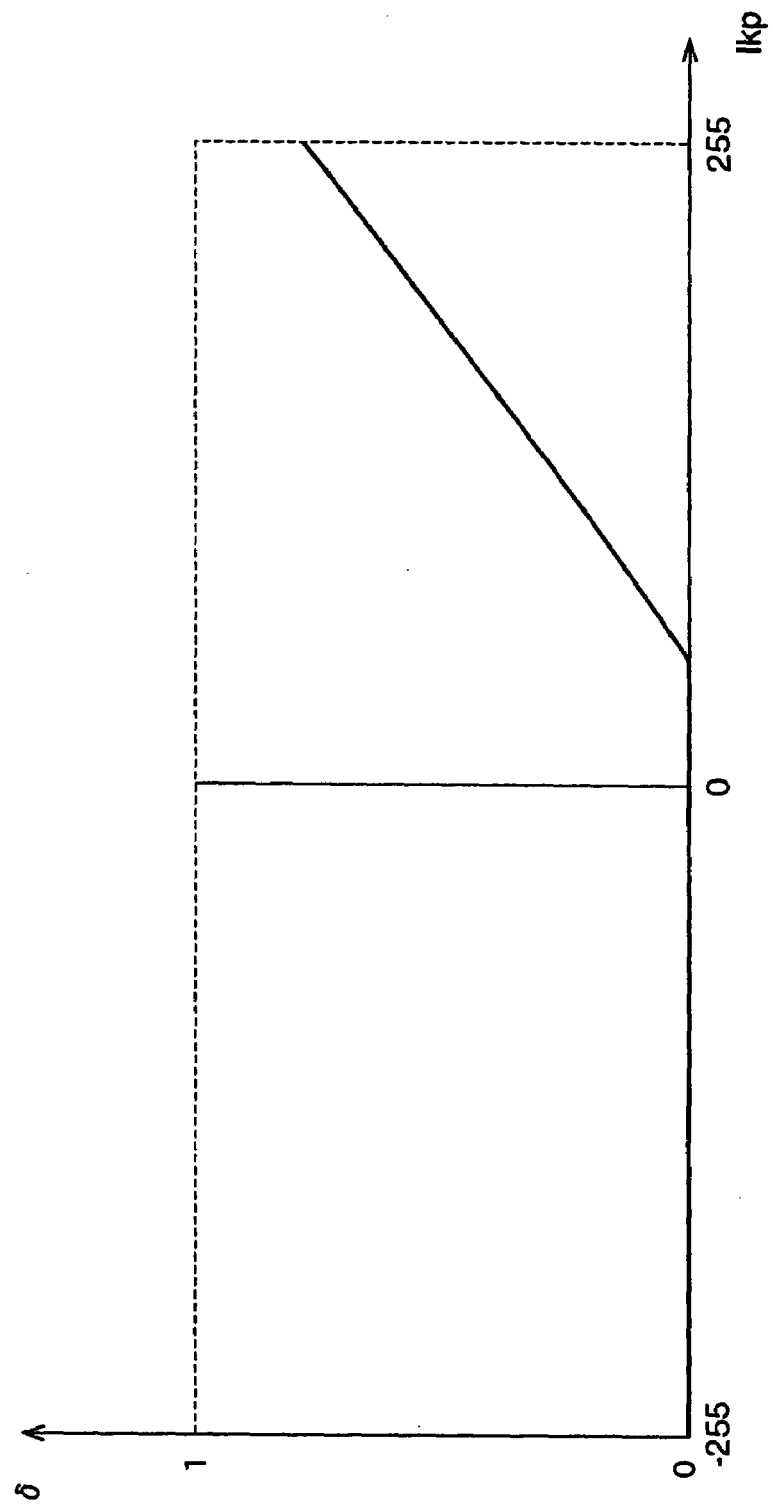
FIG. 12 is a graph for explaining a table to be looked up for obtaining the compensation factor δ based on the input-tone-level information Ikp of the neighboring pixels in the K color plane, the input-tone-level information Ikp being obtained using the equation (1) or (2)

FIG. 12 illustrates in graph a table to be looked up for the compensation factor 6 depending on the input-tone-level information Ikp of the neighboring pixels 26 in the K color plane derived from the equation (1) or (2). The value represented by the input-tone-level information Ikp in FIG. 12 ranges between "–255" and "255" via "0," which is expanded from that in FIG. 10 ranging between "0" and "255."

As illustrated in FIG. 12, the table is formulated to achieve the relationship that, as the input tone levels of the neighboring pixels 26 in the K color plane become relatively high to the input tone level of the subject pixel 25 in the K color plane, the compensation factor δ becomes larger, and that, in the region with the input tone levels of the neighboring pixels 26 in the K color plane being not higher than a given positive value, the compensation factor δ becomes "0."

Figure 13:
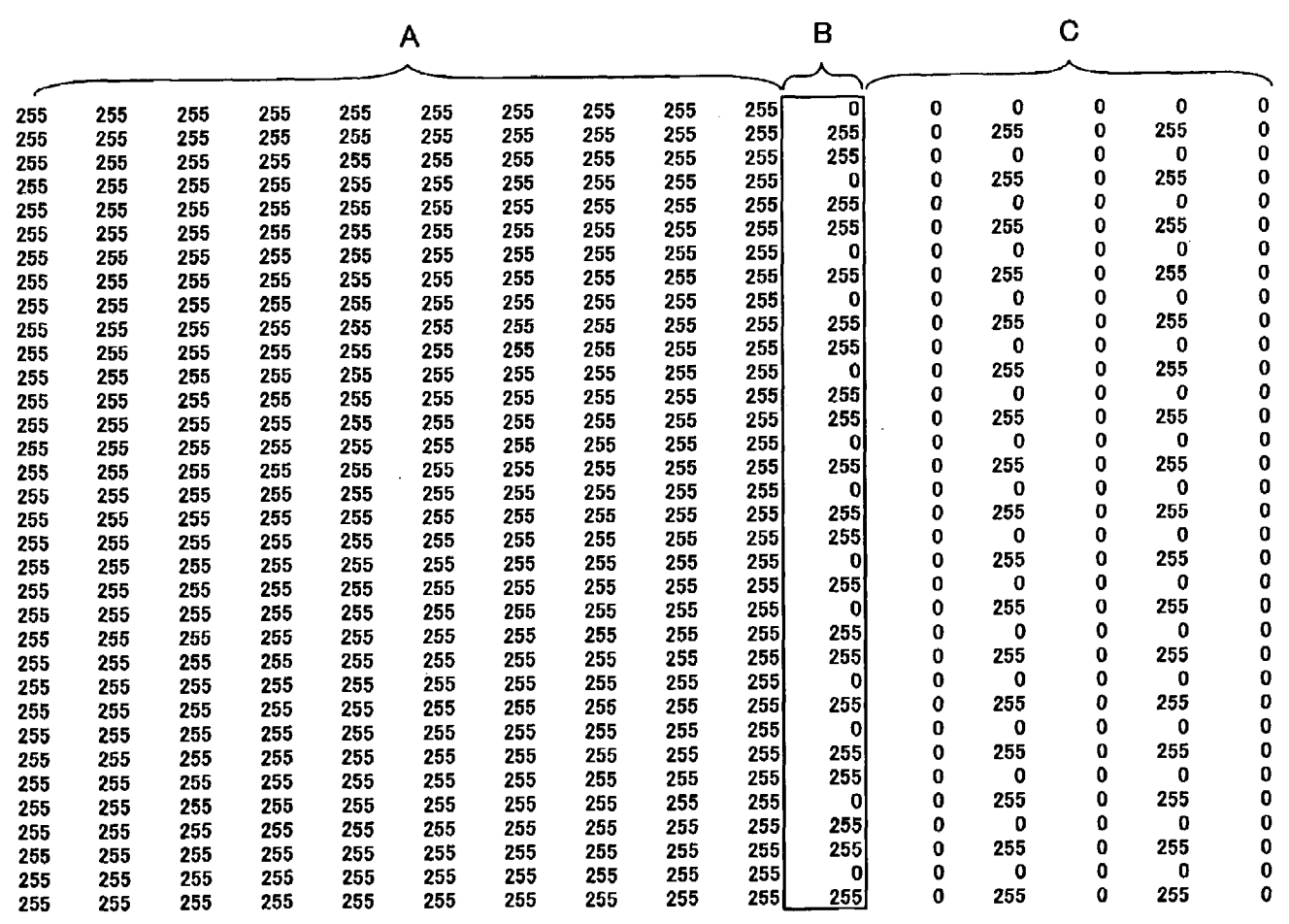

FIG. 13 illustrates the output tone levels in the Y color plane obtained by the sequential implementation of the calculation of the error compensation values γ based on the input-tone-level information Ikp calculated using the equation (1) or (2); the compensation of the assigned error e in the Y color plane using the calculated error compensation values γ; and the binarization of the compensated input-tone-level Iy'. FIG. 13 is similar to FIG. 8B.

Similarly with the first embodiment, the present embodiment may be practiced such that the compensation of the original tone levels is made so as not to change the number of ink dots formed at a K color solid region (the region C), for achieving an adequate ability of a K color ink to be fixed to the K color solid region.

As will be readily understood from the above, in the present embodiment, a portion of the aforementioned computer which is assigned to implement the halftoning for the Y color plane illustrated in flow chart in FIG. 9 constitutes an example of the "n-level quantizer" set forth in the above mode (1).

Next, a third embodiment of the present invention will be described with reference to FIG. 14.

The present embodiment is basically common to the first and second embodiments, but differs from the first and second embodiments in that the halftoning for the Y color plane (in the step S6 shown in FIG. 3) is performed using a dither method instead of the error diffusion method.

In view of this, only the halftoning for the Y color plane in the present embodiment will be described below in more detail, for better understanding the present embodiment, while common elements of the present embodiment to those of the first embodiment will be referenced the same reference numerals or names as those in the description and illustration of the first embodiment, without a redundant description and illustration.

The dither method utilizes a plurality of threshold-value sets each having at least one of individual threshold value (n−1), "n" being an integer greater than one. An example of a value of "(n−1)" is one. Each of the threshold-value sets is established for each pixel of a halftone color image. The dither method is performed for each separate color-component on a per pixel basis, such that, the corresponding threshold value and the tone level are compared with each other, to thereby effect an n-level quantization (e.g., a binarization, where n=2) in which each pixel is assigned any one of a plurality of states (n) (e.g., an on-state and an off-state).

The present embodiment will be described below by way of an example where each threshold-value set contains a plurality of threshold values corresponding to respective separate color-components, i.e., Cyan, Magenta, Yellow, and Black colors, and where the threshold-value set prepared one-by-one for each color plane ranges from "1" to "256," while the tone level of each pixel in each color plane ranges from "0" to "255."

In the above example, the dither method is performed for each separate color-component on a per pixel basis, such that the corresponding threshold value and the tone level of the corresponding color component of the subject pixel are compared with each other, to thereby effect a binarization for each pixel in each color plane.

Figure 16A:
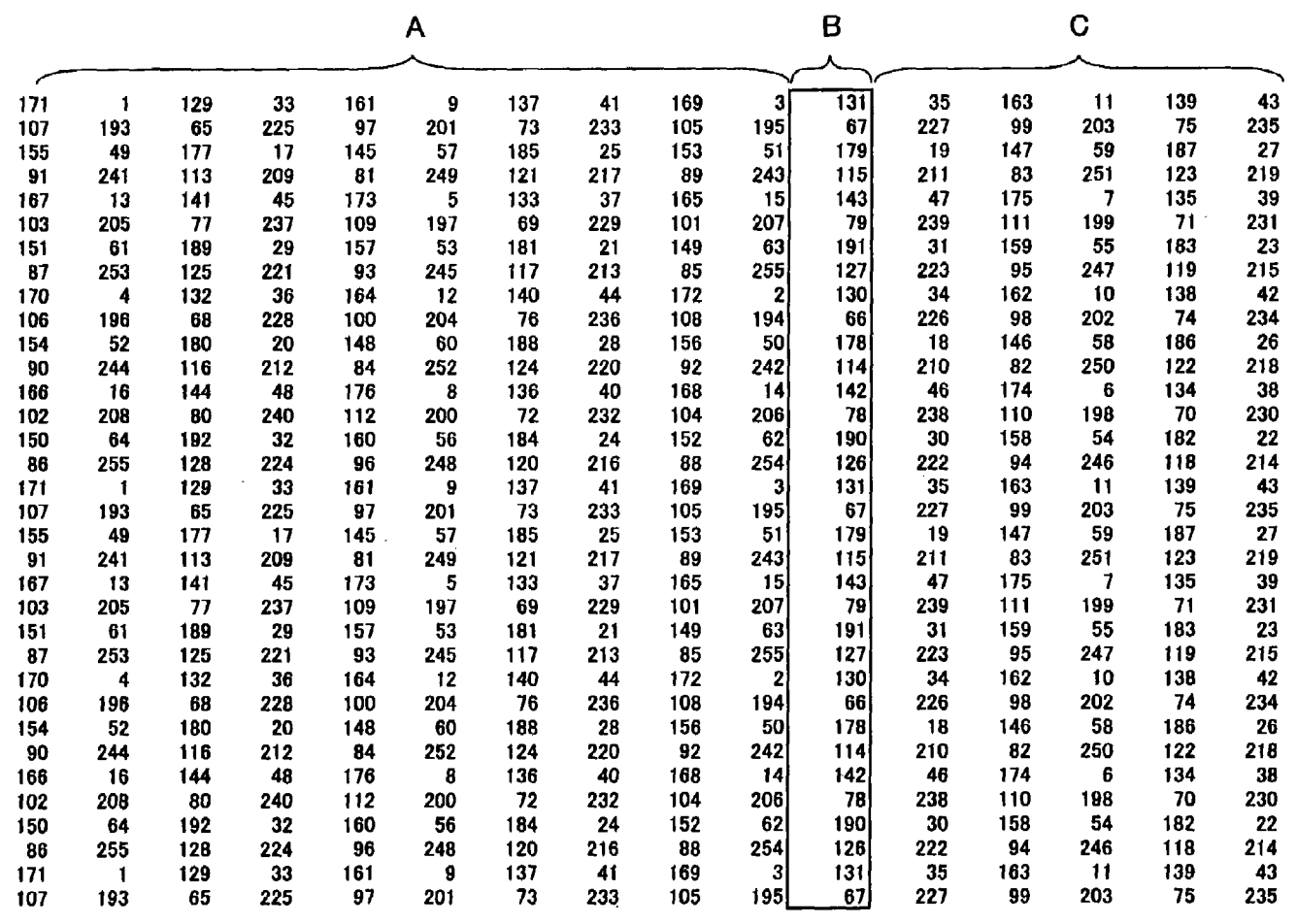

FIG. 16A exemplifies the threshold values of the input tone levels in the Y color plane of a halftone color image. The threshold values are established for the respective pixels, and range from "1" to "256." If the tone level of the subject pixel 25 is not lower than the corresponding threshold value to the subject pixel 25, then an output for printing an ink dot corresponding to the subject pixel 25 in the Y color plane is set to "on."

In contrast, if the tone level of the subject pixel 25 is lower than the corresponding threshold value to the subject pixel 25, then an output for printing an ink dot corresponding to the subject pixel 25 in the Y color plane is set to "off." In this manner, the input tone level of each pixel in the Y color plane of a halftone color image is binarized.

Figure 14:
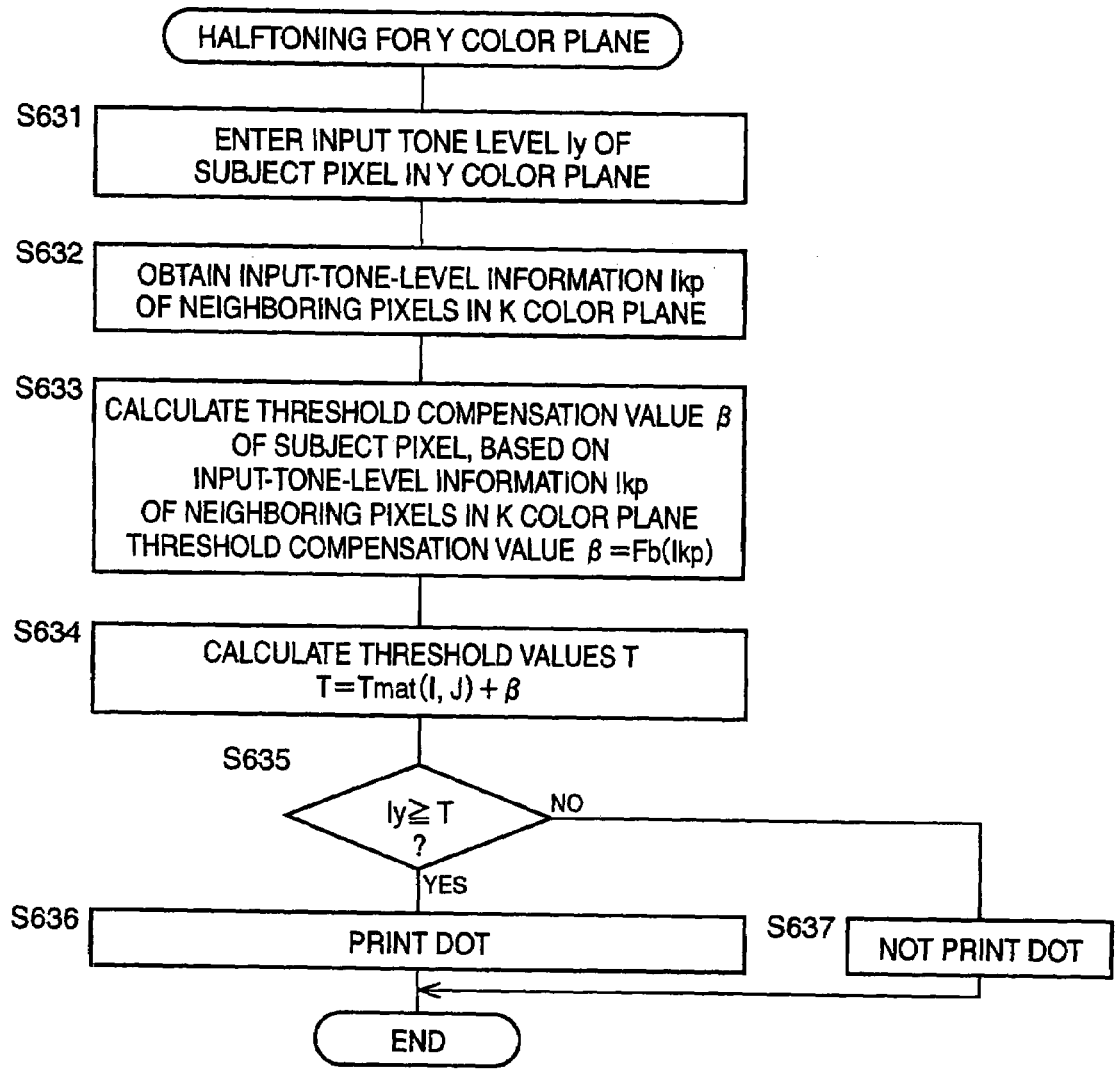
FIG. 14 schematically illustrates in flow chart a halftoning routine for Y color plane in an image forming apparatus according to a third embodiment of the present invention, FIG. 14 being similar to FIG. 4.

Referring now to FIG. 14, there is schematically illustrated in flow chart a halftoning (in the step S6 shown in FIG. 3) for the Y color plane in the present embodiment. The flow chart in FIG. 14 is similar to that in FIG. 4.

Upon entry into the halftoning for the Y color plane, a step S631 is implemented to retrieve the input tone level Iy of the subject pixel 25 in the Y color plane. The step S631 is followed by a step S632 to retrieve the input-tone-level information Ikp of the neighboring pixels 26 in the K color plane.

By definition, the input-tone-level information Ikp of the neighboring pixels 26 in the K color plane represents a maximum or otherwise an average, of the input tone levels of the eight neighboring pixels 26 in the K color plane.

The step S632 is followed by a step S633 to determine a threshold compensation value $\beta$ depending on the input-tone-level information Ikp of the neighboring pixels 26 in the K color plane obtained in the step S632.

Figure 15:
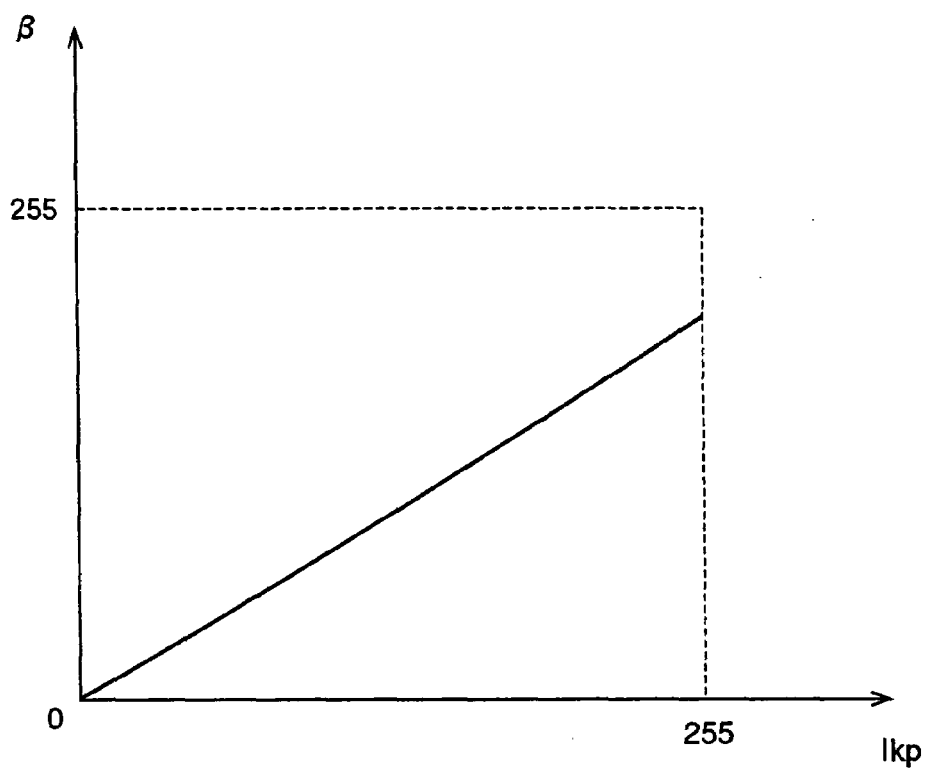
FIG. 15 is a graph for explaining a table to be looked up for obtaining a threshold compensation value β in the third embodiment, based on the input-tone-level information Ikp of the neighboring pixels in a K color plane.

FIG. 15 illustrates in graph a table to be looked up for determining the threshold compensation value $\beta$ depending on the input-tone-level information Ikp of the neighboring pixels 26 in the K color plane. As illustrated in FIG. 15, the table is formulated such that, as the input-tone-level represented by the input-tone-level information Ikp of the neighboring pixels 26 in the K color plane increases, the threshold compensation value $\beta$ increases.

As illustrated in FIG. 15, the threshold compensation value $\beta$ is a function of a value represented by the input-tone-level information Ikp, and the relationship therebetween is denoted by the following expression as shown in FIG. 14:

$$\beta = Fb(Ikp).$$

The step S633 is followed by a step S634 to add to the determined threshold compensation value $\beta$, the threshold value Tmat(I, J) predetermined for the subject pixel 25, to thereby calculate a threshold value T for the subject pixel 25 in the Y color plane.

Figure 16B:
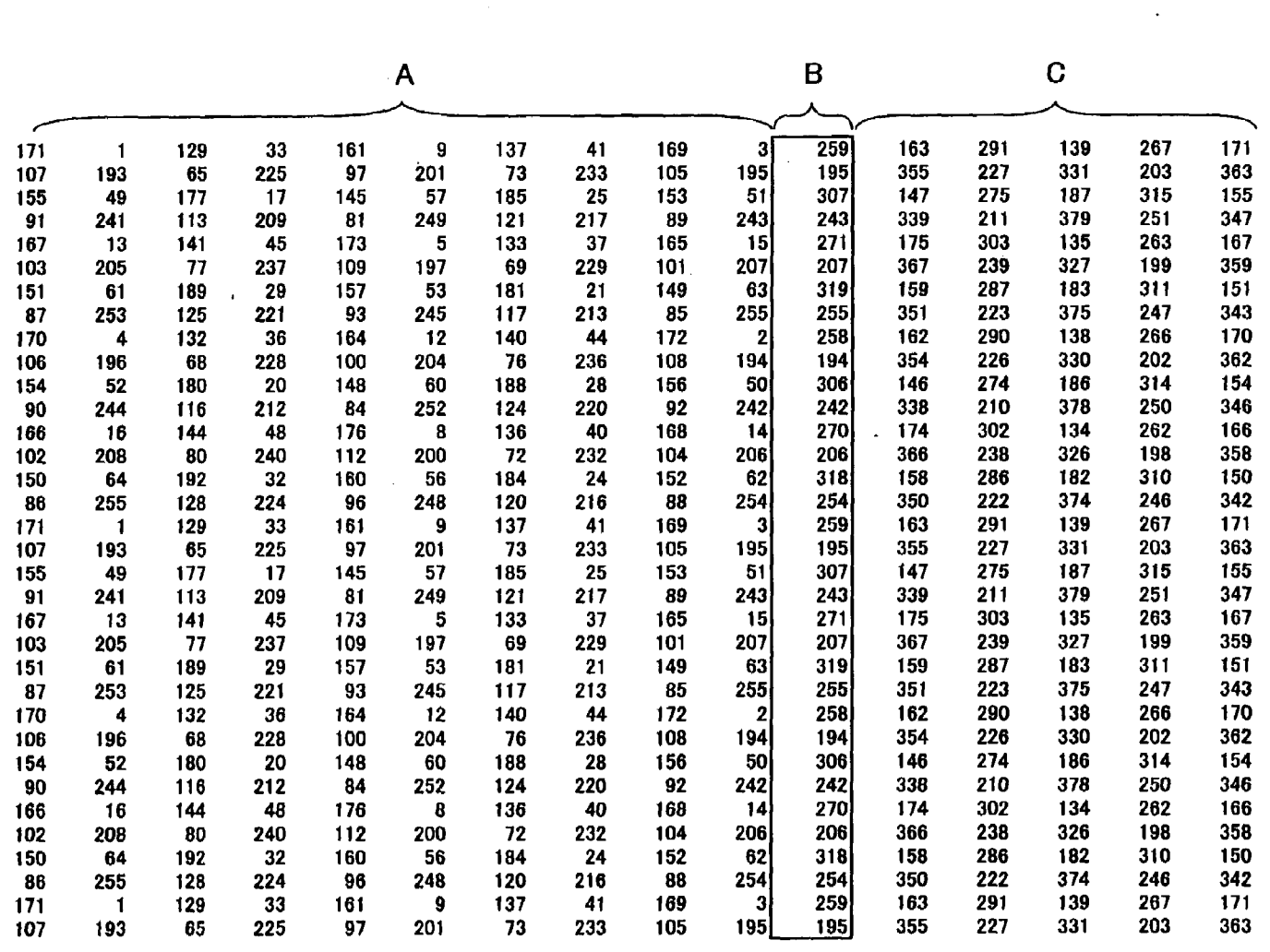

FIG. 16A illustrates an example of the threshold values Tmat placed according to a suitable dither matrix, while FIG. 16B illustrates an example of the threshold values T obtained by compensating the threshold values Tmat(I, J) illustrated in FIG. 16A using the corresponding threshold compensation values $\beta$.

In FIGS. 16A and 16B, a region A is a Y color solid region, a region B is also a Y color solid region, and a region C is a K color solid region. The region B forms a boundary portion of a combined area of the Y color solid regions A and B separating it from the K color solid region C.

More specifically, FIG. 16B illustrates the threshold values T with the corresponding threshold compensation values $\beta$ all being equal to "128" for the pixels in the regions B and C. As illustrated in FIG. 16B, in the regions B and C in which the corresponding neighboring pixels 26 are high in tone level in the K color plane, there is added to the threshold values Tmat which are illustrated in FIG. 16 and which correspond to the regions B and C, a value of "128" as an example of the threshold compensation value $\beta$ determined based on the input-tone-level information Ikp of the neighboring pixels 26 in the K color plane.

Thereafter, a step S635 is implemented to determine whether or not the input-tone-level Iy of the subject pixel 25 in the Y color plane is not lower than the corresponding threshold value T determined in the step S634. If the input-tone-level Iy is lower than the corresponding threshold value T, then the determination becomes negative "NO," and the execution proceeds to a step S637 to set an output of an output density level of the subject pixel 25 to an off state.

Alternatively, if the compensated input-tone-level Iy is not lower than the corresponding threshold value T, then the determination of the step S625 becomes affirmative "YES," and the execution proceeds to a step S636 to set an output density level of the subject pixel 25 to an on state.

Then, one cycle of the execution of the halftoning for the Y color plane illustrated in FIG. 14 is terminated.

The halftoning for the Y color plane in the present embodiment allows the production of binary image data for the Y color plane in a similar manner to the first and second embodiments, resulting in the achievement of the similar advantages to the first and second embodiments.

Figure 17:
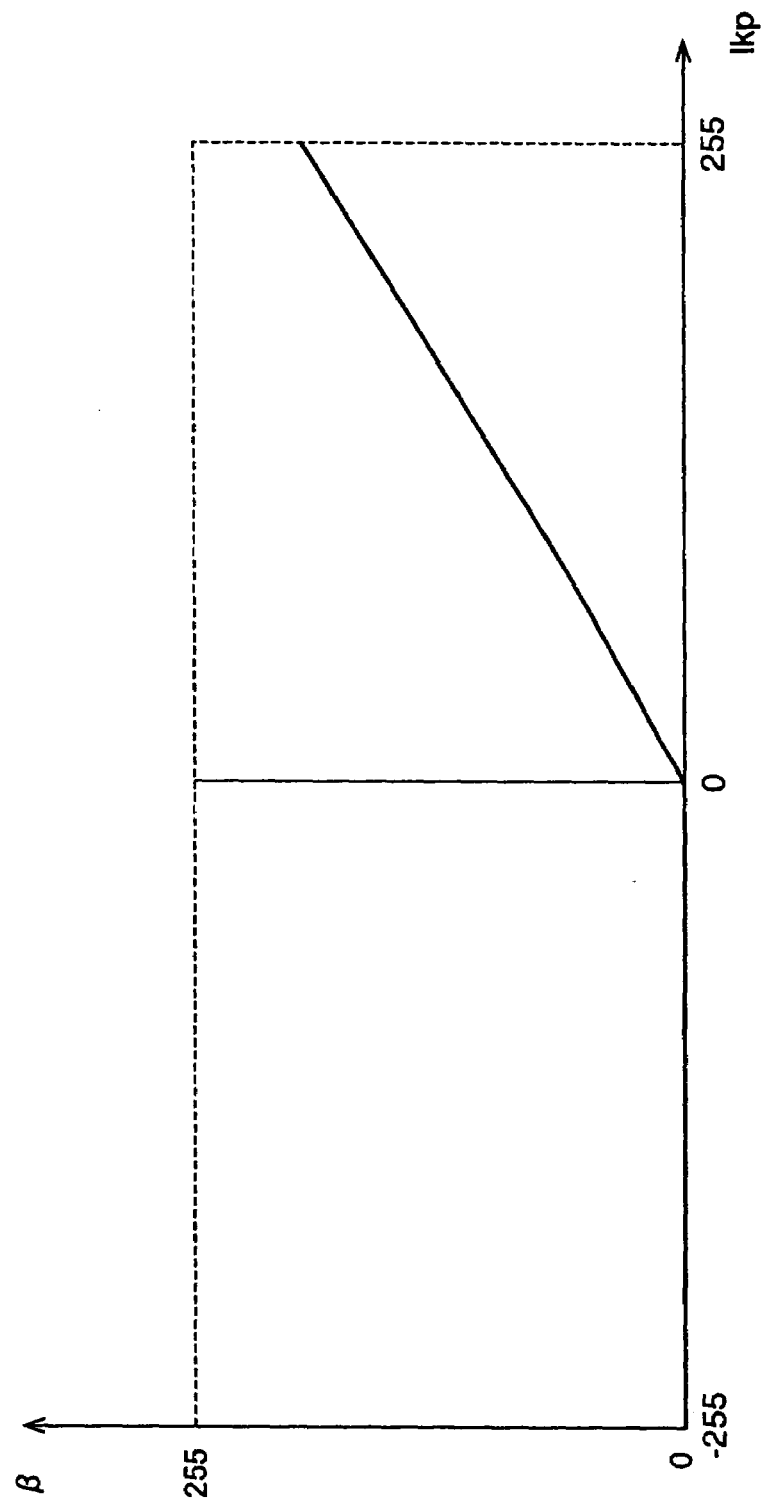
FIG. 17 is a graph for explaining a table to be looked up for obtaining the threshold compensation values β based on the input-tone-level information Ikp of the neighboring pixels in the K color plane, the input-tone-level information Ikp being obtained using the equation (1) or (2)

FIG. 17 illustrates in graph a table to be looked up for the threshold compensation value β depending on the input-tone-level information Ikp of the neighboring pixels 26 in the K color plane derived from the equation (1) or (2). FIG. 17 is similar to FIG. 7. The value represented by the input-tone-level information Ikp is a relative value depending on the difference in tone level in the K color plane between the subject pixel 25 and the neighboring pixels 26.

As illustrated in FIG. 17, the table is formulated to achieve the relationship that, as the input tone levels of the neighboring pixels 26 in the K color plane become relatively high to the input tone level of the subject pixel 25 in the K color plane, the threshold compensation value β becomes larger, and that, in the region in which the subject pixel 25 is higher in the input tone level in the K color plane than the neighboring pixels 26, i.e., in which the relative value represented by the input-tone-level information Ikp of the neighboring pixels 26 in the K color plane is not larger than "0," the threshold compensation value β becomes "0."

Figure 18:
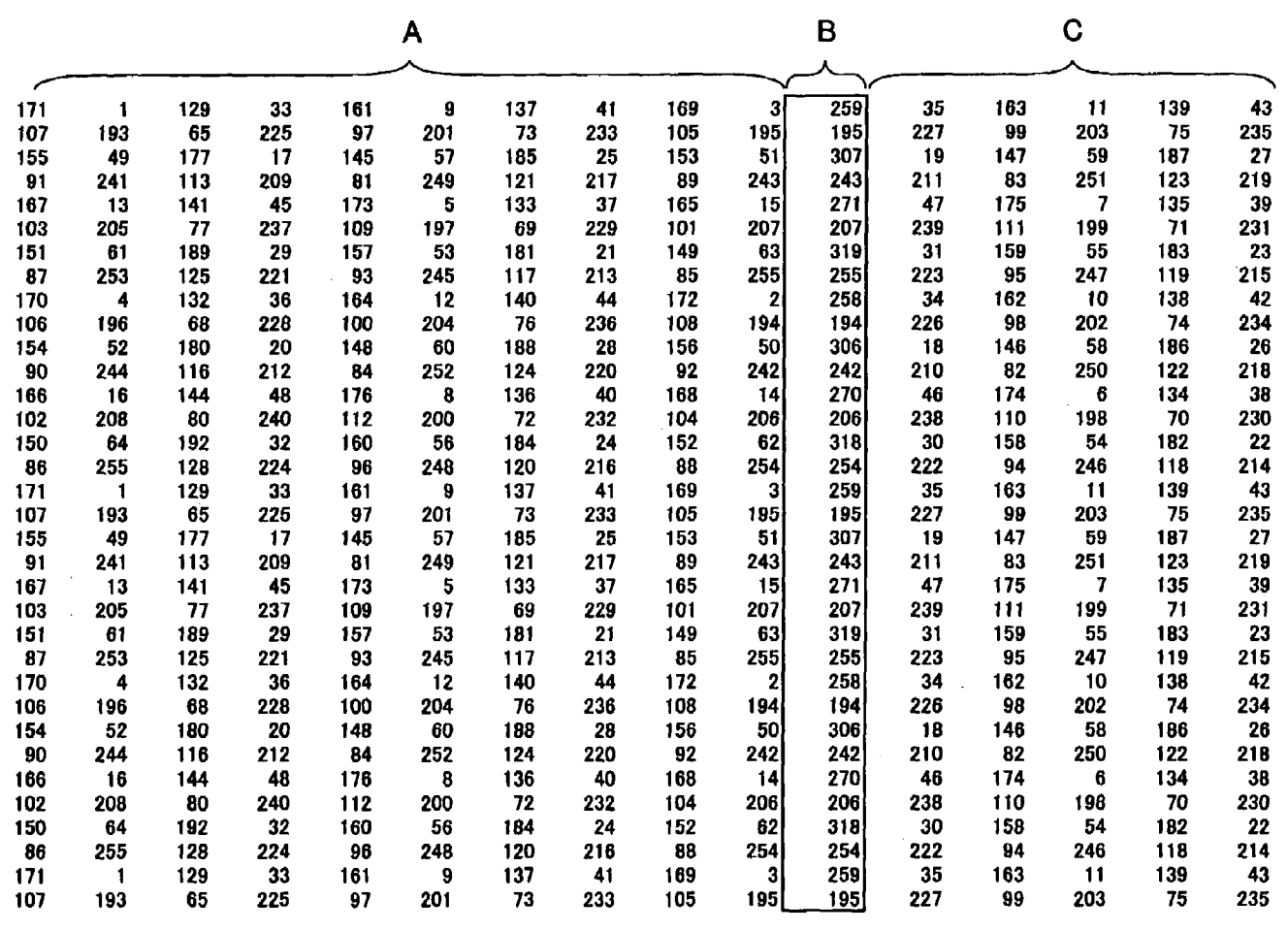

FIG. 18 illustrates the threshold values T obtained by compensating the corresponding threshold values Tmat (the original values) using the corresponding threshold compensation values β which is obtained based on the input-tone-level information Ikp calculated using the equation (1) or (2).

As illustrated in FIG. 18, the threshold values T is compensated so as to be increased in a boundary region between a K color solid region and a Y color solid region, which is to say, the region B in which the neighboring pixels 26 are higher in input tone level in the K color plane than the subject pixel 25, without a substantial change in number of ink dots formed in the K color solid region (the region C, for example), resulting in an adequate ability of a K color ink to be fixed to the K color solid region.

As will be readily understood from the above, in the present embodiment, a portion of the computer which is assigned to implement the halftoning for the Y color plane illustrated in flow chart in FIG. 14 constitutes an example of the "n-level quantizer" set forth in the above mode (6).

Next, a fourth embodiment of the present invention will be described with reference to FIGS. 19A, 19B, and 19C.

The present embodiment is basically common to the first through third embodiments, but differs from the first through third embodiments in the definition of the neighboring pixels 26.

In view of this, only the definition of the neighboring pixels 26 in the present embodiment will be described below in more detail, for better understanding the present embodiment, while common elements of the present embodiment to those of the first embodiment will be referenced the same reference numerals or names as those in the description and illustration of the first embodiment, without a redundant description and illustration.

In the first embodiment, the neighboring pixels 26 are defined, as shown by hatching in FIG. 2, to be eight pixels surrounding the subject pixel 25. Alternatively, the neighboring pixels 26 may be defined according to the size of an ink droplet, a medium to be printed, a print resolution to be required, the size of each pixel, etc.

Figure 19A:
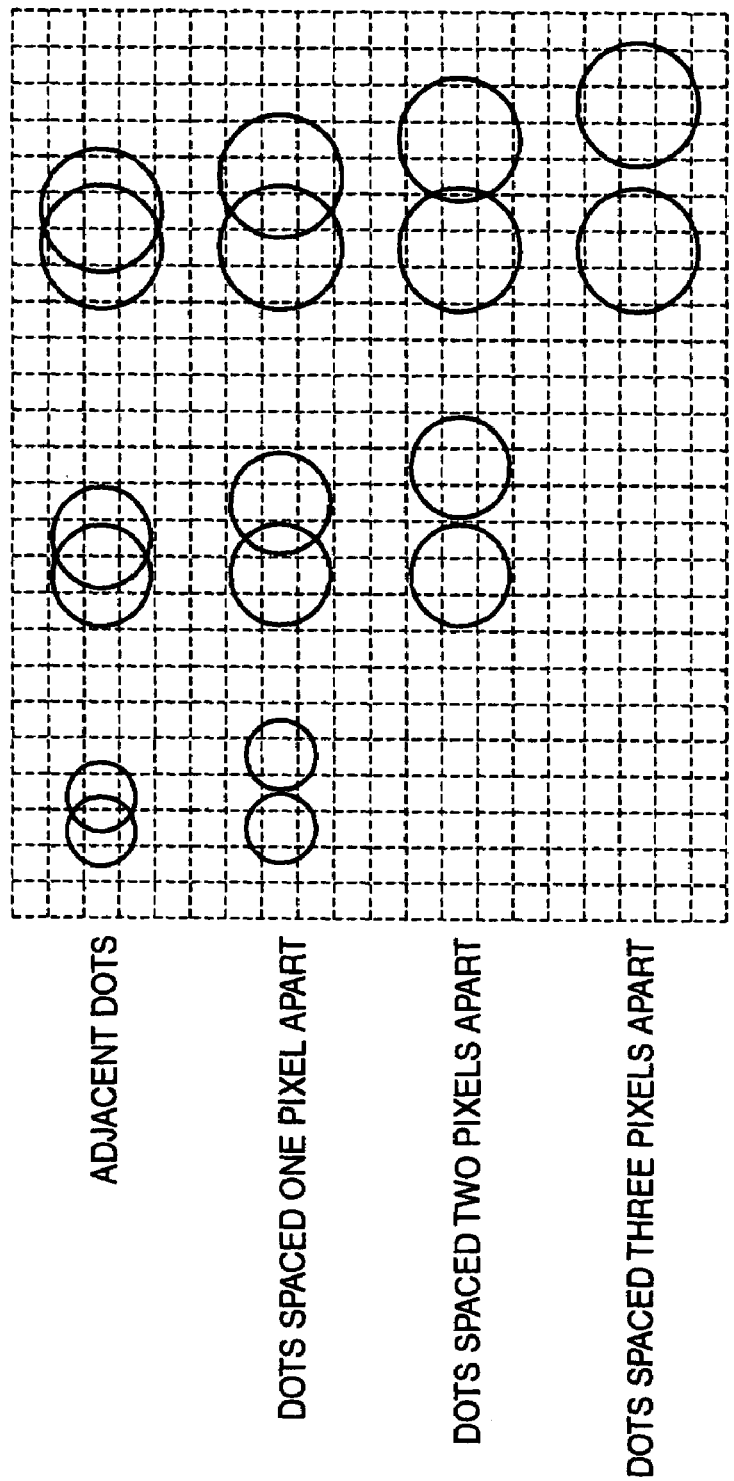
FIG. 19A is a view for explaining the dependency between the selection of neighboring pixels and whether or not an overlap between ink dots is present, FIG. 19A being for explaining an image forming apparatus according to a fourth embodiment of the present invention.
Figure 19C:
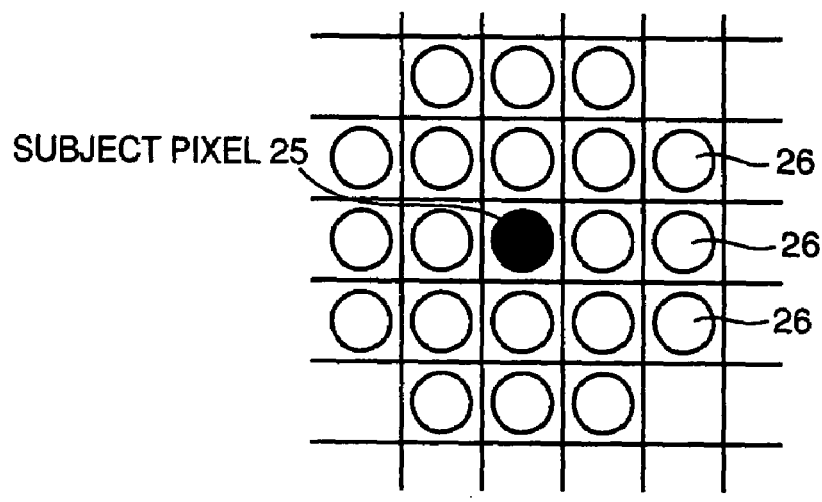
FIG. 19C is a view for explaining an example of the neighboring pixels with respect to a subject pixel.

FIGS. 19A, 19B, and 19C are prepared for explaining variations in the region containing related pixels causing the corresponding ink dots to be overlapped with each other. As illustrated in FIG. 19A, the higher the print resolution, the smaller the distance between adjacent dots, and therefore, as the print resolution increases, the number of neighboring dots which are overlapped with one common dot is increased, and a portion of an image which is to be covered by a set of the neighboring pixels 26 is enlarged in area.

In addition, as the size (e.g., the diameter) of an ink dot increases, the number of neighboring dots which are overlapped with one common dot increases, and a portion of an image which is to be covered by a set of the neighboring pixels 26 is enlarged in area.

FIG. 19B illustrates at a column labeled "*3" examples of the minimum number of at least one pixel preventing an overlap between a K color ink dot and a Y color ink dot, wherein the at least one pixel is not printed, and is interposed between two remote pixels which are printed with the K color ink dot and the Y color ink dot, respectively.

As shown in FIG. 19B, there is varied the region of the neighboring ink dots each of which is at least in part overlapped with one ink dot formed at the subject pixel 25, depending on its relationships with the print resolution, the pixel size, the dot size (e.g., the dot diameter), the recording medium, and the size of an ink droplet.

More specifically, for a recording medium of a high water absorbency type, such as a standard paper and a paper for inkjet, there is a tendency that an ink droplet spread along the surface of the recording medium in a larger area, and that the corresponding ink dot is formed in a larger size accordingly. In light of the tendency, a set of the neighboring pixels 26 is selected to cover a larger area of an image.

In contrast, for a recording medium of a low water absorbency type, such as a glossy paper and a matte paper, there is a tendency that an ink droplet spreads along the surface of the recording medium in a smaller area, and that the corresponding ink dot is formed in a smaller size accordingly. In light of the tendency, a set of the neighboring pixels 26 is selected to cover a smaller area of an image.

In addition, for an ink droplet larger in size, due to the tendency that the size of the corresponding ink dot is formed in a larger size, a set of the neighboring pixels 26 is selected to cover a larger area of an image.

In contrast, for an ink droplet smaller in size, due to the tendency that the size of the corresponding ink dot is formed in a smaller size, a set of the neighboring pixels 26 is selected to cover a smaller area of an image.

FIG. 19C illustrates the area containing the neighboring pixels 26 selected in the case where the minimum number of at least one pixel preventing an overlap between a K color ink dot and a Y color ink dot is set to two. In FIG. 19C, the black color circle denotes the subject pixel 25, while the while color circles denote the neighboring pixels 26, respectively. As is Evident from FIG. 19C, a set of the neighboring pixels 26 is selected to be a set of pixels within an area in which the ink dots formed corresponding to the neighboring pixels 26 are not overlapped with the ink dot formed corresponding to the subject pixel 25.

Figure 20A:
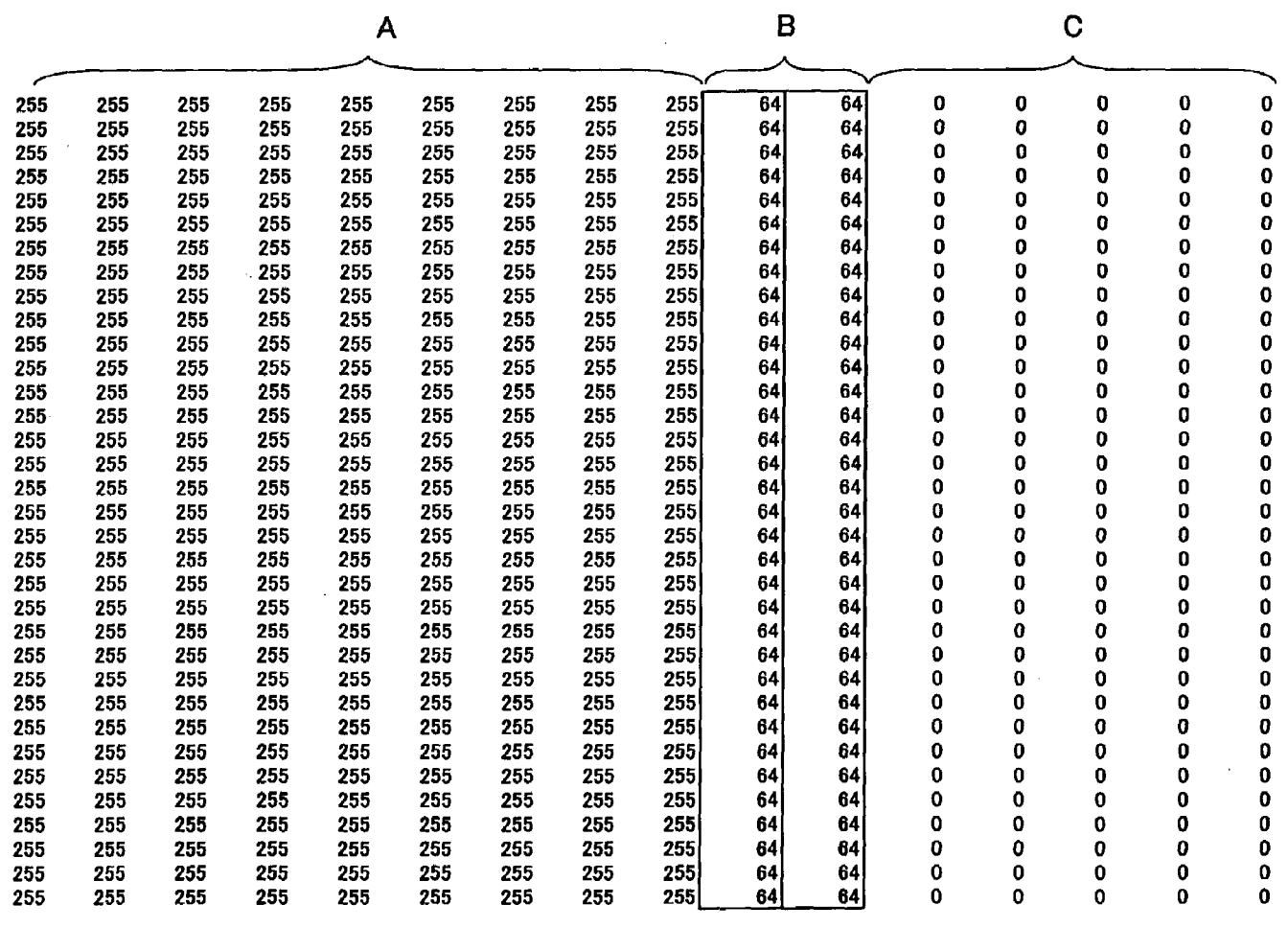
Figure 20B:
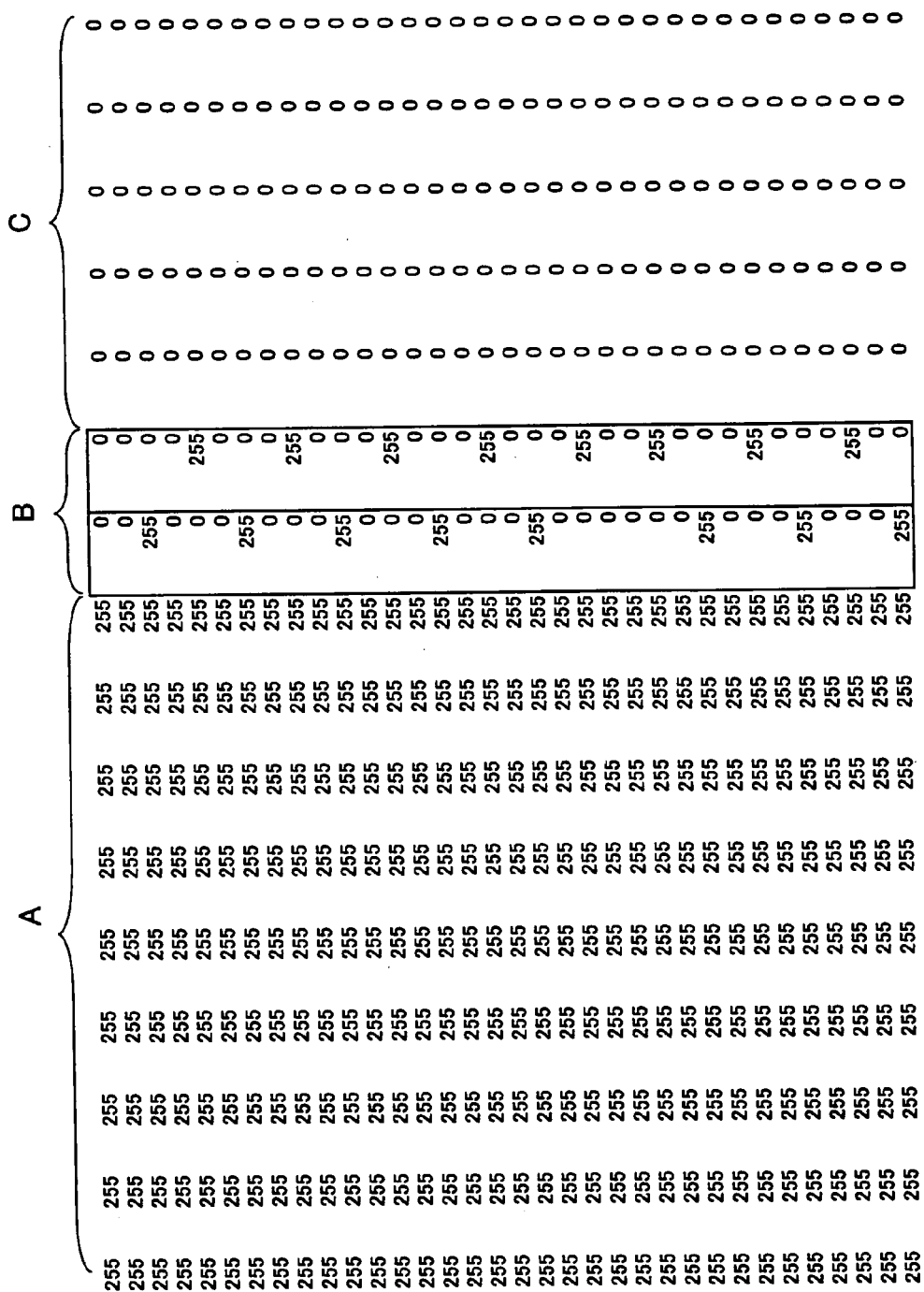
FIG. 20B illustrates an example of a set of ultimate tone levels or density values in the Y color plane calculated by the error diffusion method in the fourth embodiment.

FIG. 20A illustrates the tone levels in the Y color plane obtained in the case where the neighboring pixels 26 are selected to include up to pixels spaced two pixels apart from the subject pixel 25, and where the input tone level of the subject pixel 25 in the Y color plane is compensated from "255" to "64" based on the input-tone-level information Ikp of the neighboring pixels 26 in the K color plane. FIG. 20B illustrates the tone levels in the Y color plane calculated the error diffusion method described above.

The present embodiment prevents a color bleed more certainly, even where the minimum number of at least one pixel preventing an overlap between a K color ink dot and a Y color ink dot occurring due to the print resolution being higher, the ink droplet being larger in size, the recording medium to be used being susceptive to a color bleed, etc.

Next, a fifth embodiment of the present invention will be described with reference to FIG. 21.

The present embodiment is basically common to the first through fourth embodiments, but differs from the first through fourth embodiments in the quantization process of the tone level of each pixel.

In view of this, only the quantization process of the tone level of each pixel in the present embodiment will be described below in more detail, for better understanding the present embodiment, while common elements of the present embodiment to those of the first embodiment will be referenced the same reference numerals or names as those in the description and illustration of the first embodiment, without a redundant description and illustration.

In the first embodiment, the quantization for the tone level of each pixel is effected in the form of the binarization, so as to binarize the tone level of each pixel into an on level and an off level. However, the quantization, not limiting to the binarization, may be modified in practicing the present invention.

In the present embodiment, the quantization is performed such that the relationship between the tone level of the subject pixel 25 in the Y color plane and at least one predetermined threshold value, so that the volume of an ink droplet used for forming the corresponding ink dot is reduced, as the tone levels of pixels in the vicinity of the subject pixel 25 in the K color plane increases, for example.

In the present embodiment, the color printer 24 (see FIG. 1) is preferably formed of a type variable in print dot size.

Figure 21:
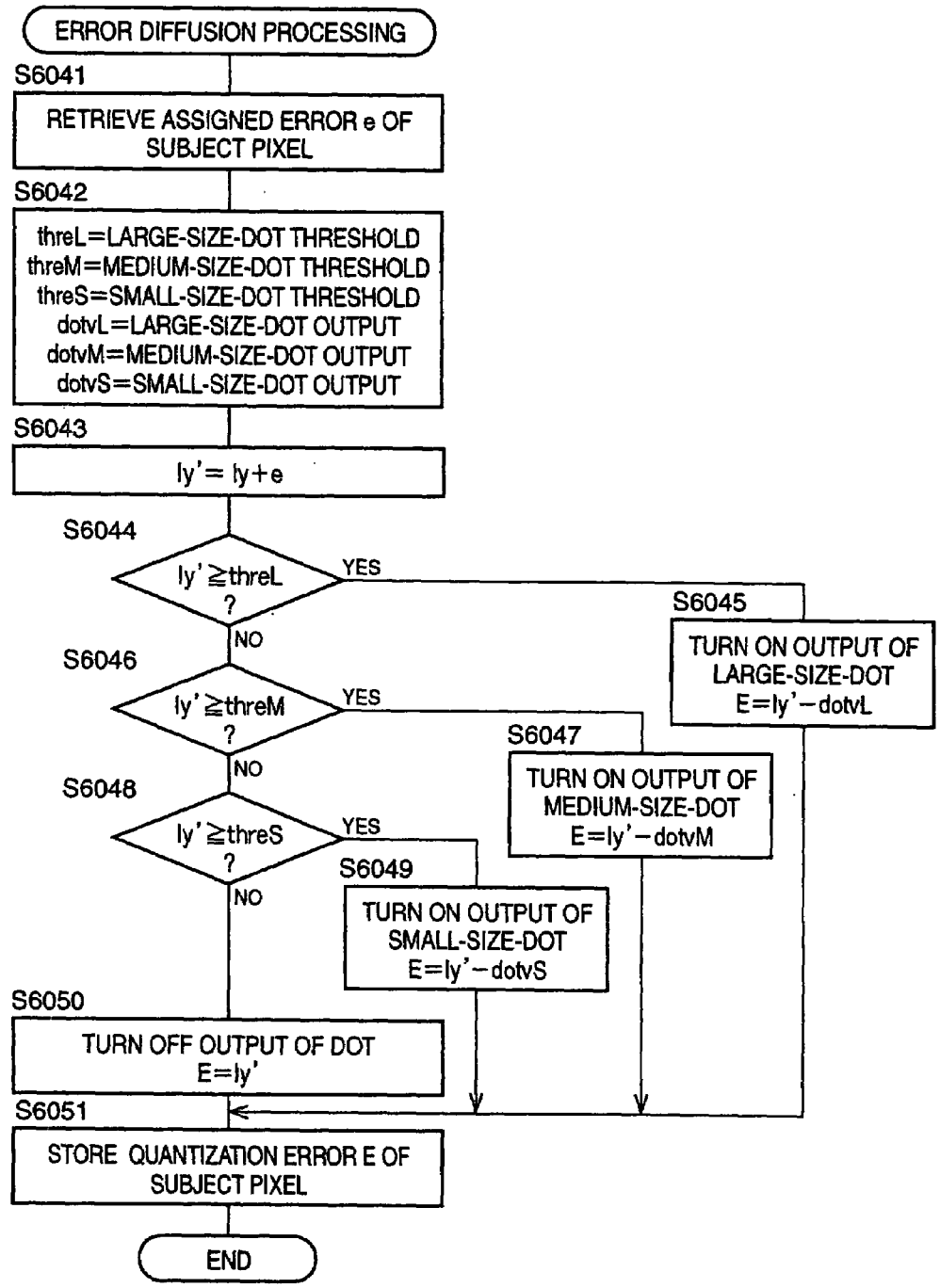
FIG. 21 schematically illustrates in flow chart a halftoning routine for Y color plane in the fourth embodiment of the present invention.
Figure 22A:
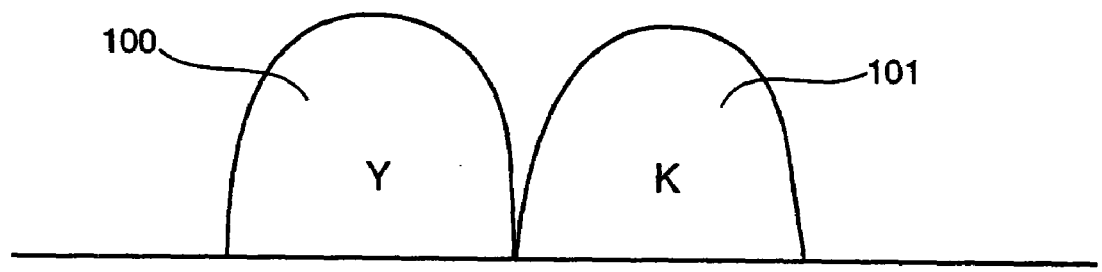
FIG. 22A schematically illustrates in enlargement a particle of K color ink and a particle of Y color ink, with these being jetted onto a recording medium at the respective positions adjacent to each other, before spread of the particle of K color ink over the particle of Y color ink.
Figure 22B:
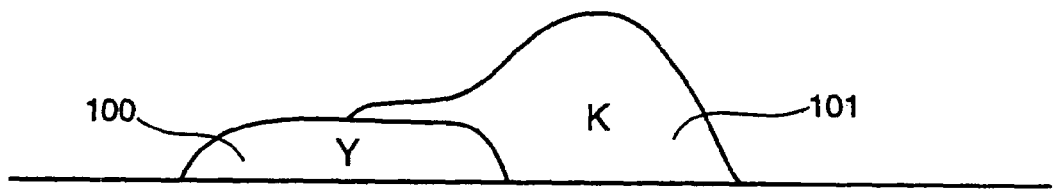
FIG. 22B schematically illustrates in a similar manner to FIG. 22A in enlargement a particle of K color ink and a particle of Y color ink, with these being jetted onto a recording medium at the respective positions adjacent to each other, after spread of the particle of K color ink over the particle of Y color ink.

FIG. 21 schematically illustrates in flow chart an error diffusion processing for effecting a 4-level quantization of the tone levels in the Y color plane in the present embodiment. In the present embodiment, the program for the halftoning for the Y color plane illustrated in FIG. 4 is executed with the processing performed in the step S604 shown in FIG. 4 being replaced with the error diffusion processing illustrated in FIG. 21.

In the present embodiment, the error diffusion processing is initiated with a step S6041 to retrieve the assigned error e of the subject pixel 25 from the error buffer memory 15c. As described above, the assigned error e is the total distribution into the subject pixel 25 from the quantization errors calculated by the error diffusion method fo5r the surrounding pixels.

The step S6041 is followed by a step S6042 to set a large-size-dot threshold "threL," a medium-size-dot threshold "threM," a small-size-dot threshold "threS," a large-size-dot output "dotvL," a medium-size-dot output "dotvM," and a small-size-dot output "dotvS," to the respective predetermined values.

The step S6042 is followed by a step S6043 to add the retrieve assigned error e of the subject pixel 25 to the input tone level Iy of the subject pixel 25 in the Y color plane, to thereby calculate a compensated input-tone-level Iy'. The input tone level Iy is one obtained in the step S603 shown in FIG. 4 by compensating the original value entered in the step S601 shown in FIG. 4, based on the input-tone-level information Ikps obtained in the step S602 shown in FIG. 4.

Thereafter, a step S6044 is implemented to determine whether or not the compensated input-tone-level Iy' is not lower than the large-size-dot threshold "threL."

If the compensated input-tone-level Iy' is not lower than the large-size-dot threshold "threL," then the determination of the step S6044 becomes affirmative "YES," and the error diffusion processing proceeds to a step S6045 to set an output for printing a large-size-dot to an on state, for an ink dot to be formed with a larger volume of the corresponding ink. The step S6044 is further implemented to subtract the large-size-dot output "dotvL" from the compensated input-tone-level Iy', to thereby calculate a quantization error E of the subject pixel 25.

Alternatively, if the compensated input-tone-level Iy' is lower than the large-size-dot threshold "threL," then the determination of the step S6044 becomes negative "NO," and the error diffusion processing proceeds to a step S6046 to determine whether or not the compensated input-tone-level Iy' is not lower than the medium-size-dot threshold "threM."

If the compensated input-tone-level Iy' is not lower than the medium-size-dot threshold "threM," then the determination of the step S6045 becomes affirmative "YES," and the error diffusion processing proceeds to a step S6047 to set an output for printing a medium-size-dot to an on state, for an ink dot to be formed with a medium volume of the corresponding ink. The step S6047 is further implemented to subtract the medium-size-dot output "dotvM" from the compensated input-tone-level Iy', to thereby calculate a quantization error E of the subject pixel 25.

On the other hand, if the compensated input-tone-level Iy' is lower than the medium-size-dot threshold "threM," then the determination of the step S6045 becomes negative "NO," and the error diffusion processing proceeds to a step S6048 to determine whether or not the compensated input-tone-level Iy' is not lower than the small-size-dot threshold "threS."

If the compensated input-tone-level Iy' is not lower than the small-size-dot threshold "threS," then the determination of the step S6048 becomes affirmative "YES," and the error diffusion processing proceeds to a step S6049 to set an output for printing a small-size-dot to an on state, for an ink dot to be formed with a small volume of the corresponding ink. The step S6049 is further implemented to subtract the small-size-dot output "dotvS" from the compensated input-tone-level Iy', to thereby calculate a quantization error E of the subject pixel 25.

In addition, if the compensated input-tone-level Iy' is lower than the small-size-dot threshold "threS," then the determination of the step S6048 becomes negative "NO," and the error diffusion processing proceeds to a step S6050 to set all outputs for printing small-size-dot, medium-size-dot, and large-size-dot to off states. The step S6050 is further implemented to determine the compensated input-tone-level Iy' as a quantization error E of the subject pixel 25.

Upon completion of a corresponding one of the steps S6045, S6047, S6049, and S6050, a step S6051 is implemented to store the quantization effort E calculated in the corresponding step. Then, one cycle of the execution of the error diffusion processing is terminated.

In the present embodiment, the input tone level of the subject pixel 25 in the Y color plane is quantized into 4 levels, depending on the input-tone-level information Ikp of the neighboring pixels 26 in the K color plane. As a result, the Y color ink dot is formed in a medium or small size even in a boundary region of a printed image between a K color ink dot region and a Y color ink dot region. This permits a region of the entire image between a sub-image formed with a K color ink and a sub-image formed with a Y color ink to be viewed as a light yellow color region when the entire image is viewed as a whole, suppressing an appearance of a white line on the surface of a recording medium between a character printed black and a portion printed yellow under the black-colored character.

As will be readily understood, the functions of the image processing implemented in the previous embodiments are achieved by the execution of related programs which are initiated by a computer system side. These programs may be stored in a storage medium, such as a flexible disc, an optical-magnetic disc, a CD-ROM, a hard disc, or the like, and may be subsequently loaded into the computer system when needed for the initiation.

Alternatively, these programs may be stored in a ROM or a back-up RAM each as a storage medium, and the ROM or the back-up RAM may be subsequently incorporated into the computer system.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for forming an image, comprising:
    an n-level quantizer effecting an n-level quantization for a halftone color image decomposed into a plurality of pixels, on a per pixel basis, the n-level quantizer comparing, for respective separate color-components contained in each pixel, a tone level of the each pixel and at least one threshold value, and quantizing the tone level of the each pixel to produce a discrete value having a plurality of levels (n), with each other, the produced discrete value being indicative of a corresponding one of a plurality of separate states (n) to the each pixel; and
    a printer forming ink dots using a plurality of different colored inks corresponding to the respective separate color-components, according to the corresponding discrete values produced by the n-level quantization on a per pixel basis,
    wherein each pixel becomes a subject pixel for which the n-level quantization is to be effected,
    wherein at least one of the plurality of pixels located in the vicinity of the subject pixel becomes at least one neighboring pixel,
    and wherein the n-level quantizer, for effecting the n-level quantization for each subject pixel, with the at least one neighboring pixel containing a first one of the separate color-components, and with the subject pixel containing a second one of the separate color-components different in color from the first color-component, compensates a relationship between the tone level of the second color-component of the subject pixel and the at least one threshold value, such that, as the tone level of the first color-component contained in the at least one neighboring pixel increases, at least one of a probability of occurrence of an ink dot formed at the subject pixel using a corresponding one of the plurality of different colored inks to the second color-component contained in the subject pixel, and a volume of the corresponding ink to the second color-component contained in the subject pixel used for forming an ink dot at the subject pixel, decreases.

2. The apparatus according to claim 1, wherein the n-level quantizer compensates at least one of the tone level of the second color-component contained in the subject pixel and the at least one threshold value, to thereby compensate the relationship.

3. The apparatus according to claim 1, wherein the n-level quantizer effects the n-level quantization for the halftone color image, such that the tone level of the subject pixel reflects a quantization error occurring due to the n-level quantization effected for the at least one neighboring pixel,
    and wherein the n-level quantizer compensates at least one of the tone level of the second color-component contained in the subject pixel and the quantization error occurring due to the n-level quantization effected for the at least one neighboring pixel, to thereby compensate the relationship, the quantization error being to be reflected by the tone level of the subject pixel.

4. The apparatus according to claim 3, wherein the n-level quantizer effects the n-level quantization for the halftone color image by an error diffusion method, such that the tone level of the subject pixel reflects the quantization error occurring due to the n-level quantization effected for the at least one neighboring pixel.

5. The apparatus according to claim 1, wherein the at least one threshold value is established for the plurality of pixels of the halftone color image in common.

6. The apparatus according to claim 1, wherein the at least one threshold value comprises a plurality of threshold-value sets each having at least one of individual threshold value (n−1), with each set being established for each pixel of the halftone color image,
    wherein the n-level quantizer effects the n-level quantization on a per pixel basis, for each separate color-component, by comparing a corresponding one of the plurality of threshold-value sets to the subject pixel, and the tone level of the subject pixel, with each other,
    and wherein the n-level quantizer compensates at least one of the tone level of the second color-component contained in the subject pixel and the corresponding threshold-value set, to thereby compensate the relationship.

7. The apparatus according to claim 6, wherein the n-level quantizer effects the n-level quantization by a dither method.

8. The apparatus according to claim 1, wherein a color of a first one of the plurality of different colored inks corresponding to the first color-component is lower in lightness than that of a second one of the plurality of different colored inks corresponding to the second color-component.

9. The apparatus according to claim 1, wherein a color of a first one of the plurality of different colored inks corresponding to the first color-component is black.

10. The apparatus according to claim 1, wherein a color of a second one of the plurality of different colored inks corresponding to the second color-component is yellow.

11. The apparatus according to claim 1, wherein a first one of the plurality of different colored inks corresponding to the first color-component penetrates a recording medium on which the halftone color image is to be printed by the printer at a speed different from a second one of the plurality of different colored inks corresponding to the second color-component does.

12. The apparatus according to claim 11, wherein the first ink penetrates the recording medium at a lower speed than the second ink.

13. The apparatus according to claim 11, wherein the first ink is a pigment-based ink, and the second ink is a dye-based ink.

14. A method of forming an image, comprising the steps of:

effecting an n-level quantization for a halftone color image decomposed into a plurality of pixels, on a per pixel basis, the step of effecting the n-level quantization including the step of comparing, for respective separate color-components contained in each pixel, a tone level of the each pixel and at least one threshold value, and quantizing the tone level of the each pixel to produce a discrete value having a plurality of levels (n), with each other, the produced discrete value being indicative of a corresponding one of a plurality of separate states (n) to the each pixel; and forming ink dots using a plurality of different colored inks corresponding to the respective separate color-components, according to the corresponding discrete values produced by the n-level quantization on a per pixel basis, wherein each pixel becomes a subject pixel for which the n-level quantization is to be effected, wherein at least one of the plurality of pixels located in the vicinity of the subject pixel becomes at least one neighboring pixel, and wherein the step of effecting the n-level quantization, for effecting the n-level quantization for each subject pixel, with the at least one neighboring pixel containing a first one of the separate color-components, and with the subject pixel containing a second one of the separate color-components different in color from the first color-component, includes the step of compensating a relationship between the tone level of the second color-component of the subject pixel and the at least one threshold value, such that, as the tone level of the first color-component contained in the at least one neighboring pixel increases, at least one of a probability of occurrence of an ink dot formed at the subject pixel using a corresponding one of the plurality of separate inks to the second color-component contained in the subject pixel, and a volume of the corresponding ink to the second color-component contained in the subject pixel used for forming an ink dot at the subject pixel, decreases.

15. The method according to claim 14, wherein the step of effecting the n-level quantization comprises the step of compensating at least one of the tone level of the second color-component contained in the subject pixel and the at least one threshold value, to thereby compensate the relationship.

16. The method according to claim 14, wherein the step of effecting the n-level quantization comprises the step of performing the n-level quantization for the halftone color image, such that the tone level of the subject pixel reflects a quantization error occurring due to the n-level quantization effected for the at least one neighboring pixel, and wherein the step of effecting the n-level quantization comprises the step of compensating at least one of the tone level of the second color-component contained in the subject pixel and the quantization error occurring due to the n-level quantization effected for the at least one neighboring pixel, to thereby compensate the relationship, the quantization effort being to be reflected by the tone level of the subject pixel.

17. The method according to claim 14, wherein the at least one threshold value comprises a plurality of threshold-value sets each having at least one of individual threshold value (n−1), with each set being established for each pixel of the halftone color image, wherein the step of effecting the n-level quantization comprises the step of performing the n-level quantization on a per pixel basis, for each separate color-component, by comparing a corresponding one of the plurality of threshold-value sets to the subject pixel, and the tone level of the subject pixel, with each other, and wherein the step of effecting the n-level quantization comprises the step of compensating at least one of the tone level of the second color-component contained in the subject pixel and the corresponding threshold-value set, to thereby compensate the relationship.

18. The method according to claim 14, wherein a color of a first one of the plurality of different colored inks corresponding to the first color-component is lower in lightness than that of a second one of the plurality of different colored inks corresponding to the second color-component.

19. The method according to claim 14, wherein a color of a first one of the plurality of different colored inks corresponding to the first color-component is black.

20. The method according to claim 14, wherein a color of a second one of the plurality of different colored inks corresponding to the second color-component is yellow.

21. The method according to claim 14, wherein a first one of the plurality of different colored inks corresponding to the first color-component penetrates a recording medium on which the halftone color image is to be printed by the printer at a speed different from a second one of the plurality of different colored inks corresponding to the second color-component does.

22. The method according to claim 21, wherein the first ink penetrates the recording medium at a lower speed than the second ink.

23. The method according to claim 21, wherein the first ink is a pigment-based ink, and the second ink is a dye-based ink.

24. A program stored in a computer-readable medium executed by a computer for practicing the method according to claim 14.

* * * * *